United States Patent
Coggins et al.

(10) Patent No.: US 10,209,117 B1
(45) Date of Patent: Feb. 19, 2019

(54) METHOD AND SYSTEM FOR MEASURING AND MANAGING INVENTORY OF PRODUCT IN A COLLAPSIBLE TANK

(75) Inventors: Keith R. Coggins, Houston, TX (US); Dirk Holcomb, Flowery Branch, GA (US); Timothy L. Archer, Suwanee, GA (US)

(73) Assignee: Varec, Inc., Norcross, GA (US)

( * ) Notice: Subject to any disclaimer, the term of this patent is extended or adjusted under 35 U.S.C. 154(b) by 1612 days.

(21) Appl. No.: 13/466,731

(22) Filed: May 8, 2012

Related U.S. Application Data

(63) Continuation of application No. 12/561,579, filed on Sep. 17, 2009, now Pat. No. 8,195,590.

(60) Provisional application No. 61/192,435, filed on Sep. 17, 2008.

(51) Int. Cl.
- *G01F 23/00* (2006.01)
- *G01F 23/14* (2006.01)
- *G01F 22/00* (2006.01)
- *G01F 25/00* (2006.01)
- *G06N 5/00* (2006.01)

(52) U.S. Cl.
CPC .......... *G01F 23/0061* (2013.01); *G01F 22/00* (2013.01); *G01F 23/14* (2013.01); *G01F 25/0084* (2013.01); *G01F 25/0092* (2013.01); *G06N 5/00* (2013.01)

(58) Field of Classification Search
CPC ...... G01F 23/284; G01F 23/296; G01F 23/00; G01F 23/0076; G01F 23/0061; G01F 23/0069; G01F 23/14; G01F 23/18; G01F 22/00; G01F 22/02; G01F 25/0084; G01F 25/0092; G01F 25/00; G01F 25/0007
See application file for complete search history.

(56) References Cited

U.S. PATENT DOCUMENTS

| | | | |
|---|---|---|---|
| 3,956,681 | A | 5/1976 | Vail et al. |
| 3,975,633 | A | 8/1976 | Larkin |
| 4,236,144 | A | 11/1980 | Sunagawa |
| 4,275,382 | A | 6/1981 | Jannotta ................ 340/870.16 |

(Continued)

OTHER PUBLICATIONS

Janisch, Josef. "Magnetic Rotary Encoder Training", Jul. 2006, Austriamicrosystems.

(Continued)

*Primary Examiner* — Manuel L Barbee
(74) *Attorney, Agent, or Firm* — Dawn-Marie Bey; Bey & Cotropia PLLC

(57) ABSTRACT

Measuring, controlling, and automating inventory of product stored in a collapsible tank. An interface device can interact with a sensor installed at the collapsible tank and a metering device, such as a flow meter, to generate a strap table for the collapsible tank. The strap table can include entries that correlate a process value measured by the sensor to a volume of product corresponding to that process value. Current volume of product stored in the collapsible tank can be determined by comparing a current process value to entries in the strap table or by an interpolation process. The interface device can generate an updated strap table based on a relaxation curve to account for settling of the collapsible tank. The interface device can synchronize data with a host device, such as a personal computer or handheld computer, that includes software for tracking inventory in collapsible tanks.

26 Claims, 20 Drawing Sheets

(56) References Cited

U.S. PATENT DOCUMENTS

| | | |
|---|---|---|
| 4,342,996 A | 8/1982 | Jannotta |
| 4,459,584 A | 7/1984 | Clarkson |
| 4,782,451 A | 11/1988 | Mazzarella et al. |
| 4,786,846 A | 11/1988 | Uchida |
| 4,788,648 A | 11/1988 | Ferretti et al. ............. 702/55 |
| 4,807,464 A | 2/1989 | Janotta |
| 4,821,022 A | 4/1989 | Jannotta |
| 4,838,249 A | 6/1989 | Jannotta |
| 4,920,797 A | 5/1990 | Swartz et al. |
| 4,924,700 A | 5/1990 | Habart |
| 5,048,560 A | 9/1991 | Jannotta et al. |
| 5,056,017 A | 10/1991 | McGarvey ................. 705/28 |
| 5,065,013 A | 11/1991 | Taylor |
| 5,091,716 A | 2/1992 | Nelson et al. |
| 5,103,225 A | 4/1992 | Dolan et al. |
| 5,104,056 A | 4/1992 | Jannotta et al. |
| 5,136,883 A | 8/1992 | Jannotta |
| 5,243,860 A | 9/1993 | Habart |
| 5,297,423 A | 3/1994 | Keating et al. |
| 5,432,711 A | 7/1995 | Jackson |
| 5,487,300 A * | 1/1996 | Brackett ............. B67D 7/08 73/201 |
| 5,596,188 A | 1/1997 | McElroy |
| 5,627,523 A | 5/1997 | Besprozvanny et al. |
| 5,655,403 A | 8/1997 | Topliff |
| 5,655,841 A | 8/1997 | Storm |
| 5,705,733 A | 1/1998 | Jannotta |
| 5,736,865 A | 4/1998 | Nelson et al. |
| 5,941,122 A | 8/1999 | Nelson et al. |
| 6,363,785 B1 | 4/2002 | Senghaas et al. |
| 6,633,826 B1 | 10/2003 | Schmidt |
| 6,708,562 B2 | 3/2004 | Kruger et al. ............. 73/314 |
| 6,892,590 B1 | 5/2005 | Andermo |
| 6,898,744 B1 | 5/2005 | Jannotta |
| 6,899,129 B2 | 5/2005 | Jannotta |
| 6,992,757 B2 | 1/2006 | Holcomb et al. |
| 7,021,139 B2 | 4/2006 | Fukuhara et al. |
| 7,093,485 B2 | 8/2006 | Newman et al. |
| 7,095,228 B2 | 8/2006 | Steele et al. |
| 7,222,530 B2 | 5/2007 | Fukuhara et al. |
| 7,339,245 B2 | 3/2008 | Mueller |
| 7,376,495 B2 | 5/2008 | Coggins et al. ............. 701/3 |
| 7,424,373 B2 | 9/2008 | Mueller et al. |
| 7,725,273 B2 | 5/2010 | Jannotta |
| 8,010,312 B2 | 8/2011 | Hocker |
| 8,069,722 B1 | 12/2011 | Jannotta et al. |
| 8,195,590 B1 | 6/2012 | Coggins et al. |
| 2004/0182150 A1 | 1/2004 | Okada et al. |
| 2004/0044497 A1 * | 3/2004 | Rogers ............. B67D 7/08 702/156 |
| 2004/0079150 A1 | 4/2004 | Breed et al. ............. 73/291 |
| 2005/0274915 A1 | 12/2005 | Holcomb et al. ............. 250/577 |
| 2006/0142953 A1 | 6/2006 | Mueller et al. |
| 2006/0169055 A1 | 8/2006 | Agam et al. ............. 73/861.23 |
| 2009/0013798 A1 | 1/2009 | Hocker |
| 2009/0038405 A1 | 2/2009 | Hocker |
| 2009/0038406 A1 | 2/2009 | Hocker |
| 2009/0049925 A1 | 2/2009 | Hocker |
| 2009/0210077 A1 | 8/2009 | Lefebvre |
| 2009/0210692 A1 | 8/2009 | Wittmer et al. |
| 2009/0222699 A1 | 9/2009 | Abbott et al. |
| 2009/0303090 A1 | 12/2009 | Korn et al. |
| 2010/0150425 A1 | 6/2010 | Kalteis |
| 2011/0062942 A1 | 3/2011 | Karbula et al. |
| 2011/0153259 A1 | 6/2011 | Michael et al. |

OTHER PUBLICATIONS

Datasheet for AMT203 12 Bit Absolute Encoder, Apr. 2010, CUI, Inc., pp. 1-8.

"2900 Float & Tape Transmitter: Installation and Operations Manual", 2006, Varec, Inc., pp. 1-136.

\* cited by examiner

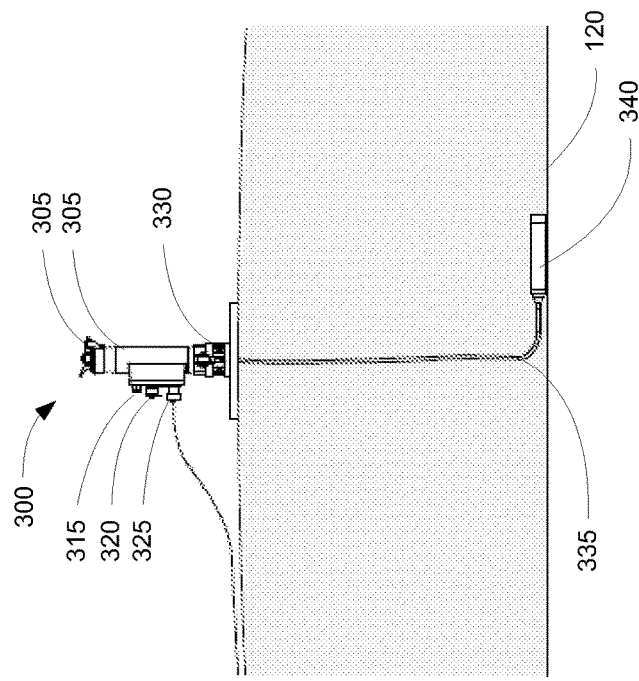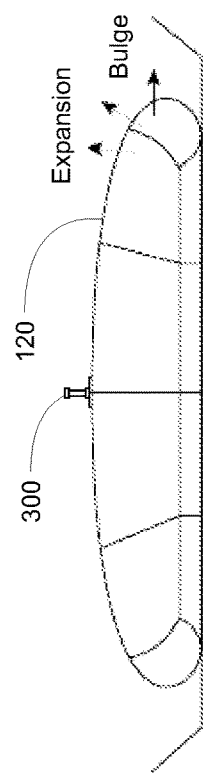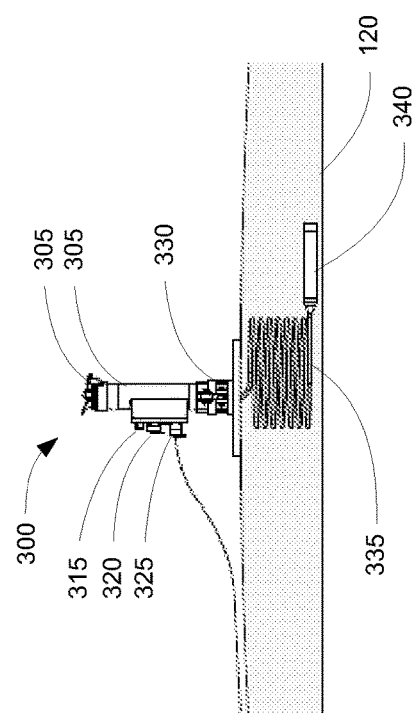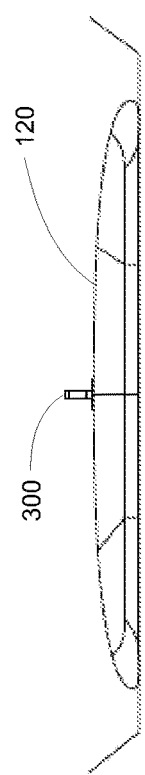
Fig. 4
Fig. 5
Fig. 6
Fig. 7

| Process Measurement (PSI) | Metered Volume (liters) | Measured Temperature (C) |
|---|---|---|
| 15.1 | 0 | 24.1 |
| 15.7 | 100 | 24.1 |
| 16.3 | 200 | 24.2 |
| * * * | * * * | * * * |
| 34.6 | 99,800 | 24.7 |
| 40.1 | 99,900 | 24.7 |
| 40.5 | 100,000 | 24.8 |

Fig. 23

METHOD AND SYSTEM FOR MEASURING AND MANAGING INVENTORY OF PRODUCT IN A COLLAPSIBLE TANK

RELATED PATENT APPLICATION

This application is a continuation of U.S. application Ser. No. 12/561,579, filed Sep. 17, 2009, which claims the benefit of U.S. Provisional Application No. 61/192,435, filed on Sep. 17, 2008, both of which are incorporated herein by reference.

TECHNICAL FIELD

The invention relates generally to collapsible tanks, and more particularly to methods and systems for accurately measuring, controlling, and automating inventory of product stored in a collapsible tank.

BACKGROUND

A collapsible tank is a type of storage container that can be relatively easily and quickly transported and deployed. Typically, a collapsible tank is made of a foldable material, such as a fabric, that can be folded during transport and unfolded for installation. Collapsible tanks are commonly used to store liquid products, such as fuel or water, in remote or temporary locations where a more permanent rigid storage tank is impractical. For example, collapsible tanks can be used to temporarily store fuel at a tactical location for military operations.

Tracking inventory of a product stored in a collapsible tank presents problems that are not encountered when storing a product in a rigid storage tank. To determine the volume of a product stored in a rigid tank, one could employ a level detector, such as a radar level detector or an ultrasonic level detector, to determine the current level of product in the rigid tank. The volume can then be calculated using the current level and the known dimensions of the tank. Another conventional method for determining the volume in a rigid tank involves the use of a pressure gauge installed at the bottom of the rigid storage tank. One could take a pressure reading and calculate the volume of product in the rigid tank using the dimensions of the tank and the density of the product stored in the tank. However, these methods for determining volume of product stored in a rigid tank can not be used to accurately determine the volume stored in a collapsible tank. As a collapsible tank is filled with a product, the shape of the collapsible tank changes as the sides of the collapsible tank bulge out and the top is elevated. Also, the collapsible tank can conform to the terrain of an installation environment that may not be flat or level. Thus, the dimensions of the collapsible tank can vary causing inaccurate calculations using the above described methods for determining the volume in a rigid storage tank.

One conventional method for determining the volume of product stored in a collapsible tank involves a person stretching a string across the top of the tank such that the string is parallel to the ground and just touching the top of the tank. The person then measures the height of the string from the ground. Finally, the person looks up the level of the tank corresponding to this height in a book containing tables of level to volume correlations generated by the manufacturer of the tank. This method suffers from inaccuracies due to unlevel ground and imperfections in the tank dimensions and materials (e.g., bulges in the material). This method can also suffer from human error. For example, the person may not hold the string level and parallel with the ground or may incorrectly and imprecisely measure the height of the string. Additionally, this method is time consuming and an expensive use of man-power.

Another conventional method for determining the volume of product stored in a collapsible tank involves metering all product into and out of a collapsible tank and then calculating a volume based on these movements. For example, if the tank is empty and 20,000 liters is pumped into the tank according to a flow meter, then the calculated volume is 20,000 liters. If 5,000 liters is subsequently pumped out of the tank according to a flow meter, then the new calculated volume would be 15,000 liters. This method often leads to problems as an operator may forget to use a meter for every movement or forget to reset the meter before moving product. Additionally, the flow meter can sometimes malfunction during a product movement resulting in an inaccurate measurement for that product movement.

Accordingly, systems and methods are needed for accurately measuring, controlling, and automating inventory of product stored in a collapsible tank.

SUMMARY

The present invention provides systems and methods for accurately measuring, controlling, and automating inventory of product stored in a collapsible tank. An interface device can perform a learning process to generate a strap table for the collapsible tank. A strap table is a table that includes multiple entries of a process value, such as a pressure or a level, and a volume of product that corresponds to that process value. For example, a strap table may contain 1000 entries starting with a process value corresponding to an empty state for the collapsible tank and ending with a process value corresponding to a full state for the collapsible tank. Intermediate entries in the strap table may be spaced at equal volumetric intervals from empty to full. The strap table can be used to determine a current volume stored in the collapsible tank by comparing a current measured process value to the entries in the strap table. The current volume is the volume of the entry having a process value equal to the current measured process value. If there is no exact match to the current measured process value in the strap table, the interface device can perform an interpolation process to determine the current volume.

The interface device can generate a strap table by interfacing with a sensor installed at the collapsible tank to obtain process values and with a flow meter to obtain an accurate volume of product in the collapsible tank corresponding to the process value. The strap table can be generated while filling the collapsible tank or while emptying the collapsible tank. To generate the strap table while filling, the interface device can poll the sensor for a first process value while the collapsible tank is in an empty or partially filled state. This process value can be stored in the strap table with a volume entry of zero (if empty) or a known volume (if partially filled). As the collapsible tank is filling, the interface device can interact with a flow meter disposed on a supply line connected to the collapsible tank to determine the volume of product supplied to the collapsible tank. For each successive entry in the strap table, the interface device can determine when a target volume is reached corresponding to that entry. The target volumes can comprise equally spaced volumetric intervals from the empty or partially filled state to a full or semi-full state. When a target volume is reached, the interface device can obtain a current process value from the sensor and store that current process value in the strap table with a corresponding volume.

Similarly, to generate a strap table while emptying the collapsible tank, the interface device can poll the sensor for a process value while the collapsible tank has a known volume of product stored therein. This process value can be stored in the strap table with a volume matching the known volume. As the collapsible tank is emptying, the interface device can interact with a flow meter disposed on an issue line connected to the collapsible tank to determine the volume of product removed from the collapsible tank. When a target volume is reached corresponding to an entry in the strap table, the interface device can obtain a current process value from the sensor and store that current process value in the strap table with a corresponding volume.

The interface device can include interfaces for coupling to a mobile host device, such as notebook computer or handheld computer. A user can access the interface device from the mobile host device to obtain current or historical process values and volumes for the collapsible tank or to activate the learning process to build a strap table for the collapsible tank. The host device can also be coupled to a host system that manages inventory of products for multiple collapsible tanks or tank farms. A handheld computer can synchronize with the host system via a cradle.

One aspect of the present invention provides a method for determining volume of a product stored in a collapsible container. A learning process is performed for the collapsible container to generate a strap table including table entries, each table entry having a process measurement measured by a sensor and a volume of product stored in the collapsible container corresponding to the process measurement. A first strap volume, corresponding to a current process measurement obtained from a sensor at the container, is calculated by performing a linear interpolation on the strap table using the current process measurement. A second strap volume corresponding to the current process measurement is determined by performing at least one polynomial interpolation on the strap table using the current process measurement. The first or second strap volume is selected as the volume of product stored in the container.

Another aspect of the invention provides a system for determining volume of a product stored in a collapsible tank. The system includes a process sensor for obtaining a process measurement for the collapsible tank and an interface device communicably coupled to the process sensor and to a metering device. The interface device can perform a learning process on the collapsible tank to generate a strap table including table entries, each table entry including a process measurement measured by the process sensor and a volume of product stored in the collapsible tank as determined by the interface device in conjunction with the metering device. The interface device can determine a current volume of product stored in the collapsible tank by obtaining a current process measurement from the process sensor and performing at least one polynomial interpolation on the strap table using the current process measurement.

Another aspect of the invention provides a method for generating a strap table for a collapsible tank. A learning process is performed on a collapsible tank to generate an initial strap table including table entries, each table entry having a process measurement measured by a sensor associated with the collapsible tank and a volume of product stored in the collapsible tank corresponding to the process measurement. The collapsible tank is allowed to store a relaxation volume of product for a time period. An updated strap table is generated to account for the collapsible tank settling during the time period.

Another aspect of the invention provides a method for determining volume of a product stored in a collapsible container. An initial strap table having table entries is generated. Each table entry includes a process measurement and a volume of product stored in the collapsible container corresponding to the process measurement. The collapsible container is allowed to store a relaxation volume of product for a time period. An updated strap table is generated to account for any relaxation of the collapsible container during the time period. A current process measurement is obtained from a sensor associated with the collapsible container. A current volume of product in the collapsible container corresponding to the current process measurement is determined using the updated strap table.

These and other aspects, objects, features, and embodiments of the invention will become apparent to a person of ordinary skill in the art upon consideration of the following detailed description of illustrative embodiments exemplifying the best mode for carrying out the invention as presently perceived.

BRIEF DESCRIPTION OF THE DRAWINGS

For a more complete understanding of the exemplary embodiments of the present invention and the advantages thereof, reference is now made to the following description, in conjunction with the accompanying figures briefly described as follows.

FIG. 4 is a cross-section of a collapsible tank in accordance with certain exemplary embodiments.

FIG. 5 is a side elevation view of the collapsible tank illustrated in FIG. 4 in accordance with certain exemplary embodiments.

FIG. 6 is a cross-section of a collapsible tank III accordance with certain exemplary embodiments.

FIG. 7 is a side elevation view of the collapsible tank illustrated in FIG. 6 in accordance with certain exemplary embodiments.

FIG. 23 depicts a portion of a strap table for a collapsible tank in accordance with certain exemplary embodiments.

DETAILED DESCRIPTION OF EXEMPLARY EMBODIMENTS

Exemplary embodiments of the present invention are provided. These embodiments include systems and methods for accurately measuring, controlling, and automating inventory of product stored in a collapsible tank. An interface device can interact with a sensor installed at the collapsible tank and a metering device, such as a flow meter, to generate a strap table for the collapsible tank. The strap table can include entries that correlate a process value measured by the sensor to a volume of product corresponding to that process value. Current volume of product stored in the collapsible tank can be determined by comparing a current process value to entries in the strap table and by using an interpolation process. The interface device can generate an updated strap table to account for settling of the collapsible tank. The interface device can synchronize data with a mobile host device, such as a notebook computer or handheld computer. The mobile host device can also synchronize data with a host system that can expose the data to other systems.

The invention can include one or more computer programs that embody the functions described herein and illustrated in the appended flow charts. However, it should be apparent that there could be many different ways of implementing aspects of the invention in computer programming, and these aspects of the invention should not be construed as limited to anyone set of computer instructions. Further, a skilled programmer would be able to write such computer programs to implement an embodiment of the disclosed invention based on the flow charts and associated description in the application text. Therefore, disclosure of a particular set of program code instructions is not considered necessary for an adequate understanding of how to make and use the invention. The inventive functionality of the claimed invention will be explained in more detail in the following description read in conjunction with the figures illustrating the program flow. Further, those skilled in the art will appreciate that one or more stages described may be performed by hardware, software, or a combination thereof, as may be embodied in one or more computing systems.

Figure 1:
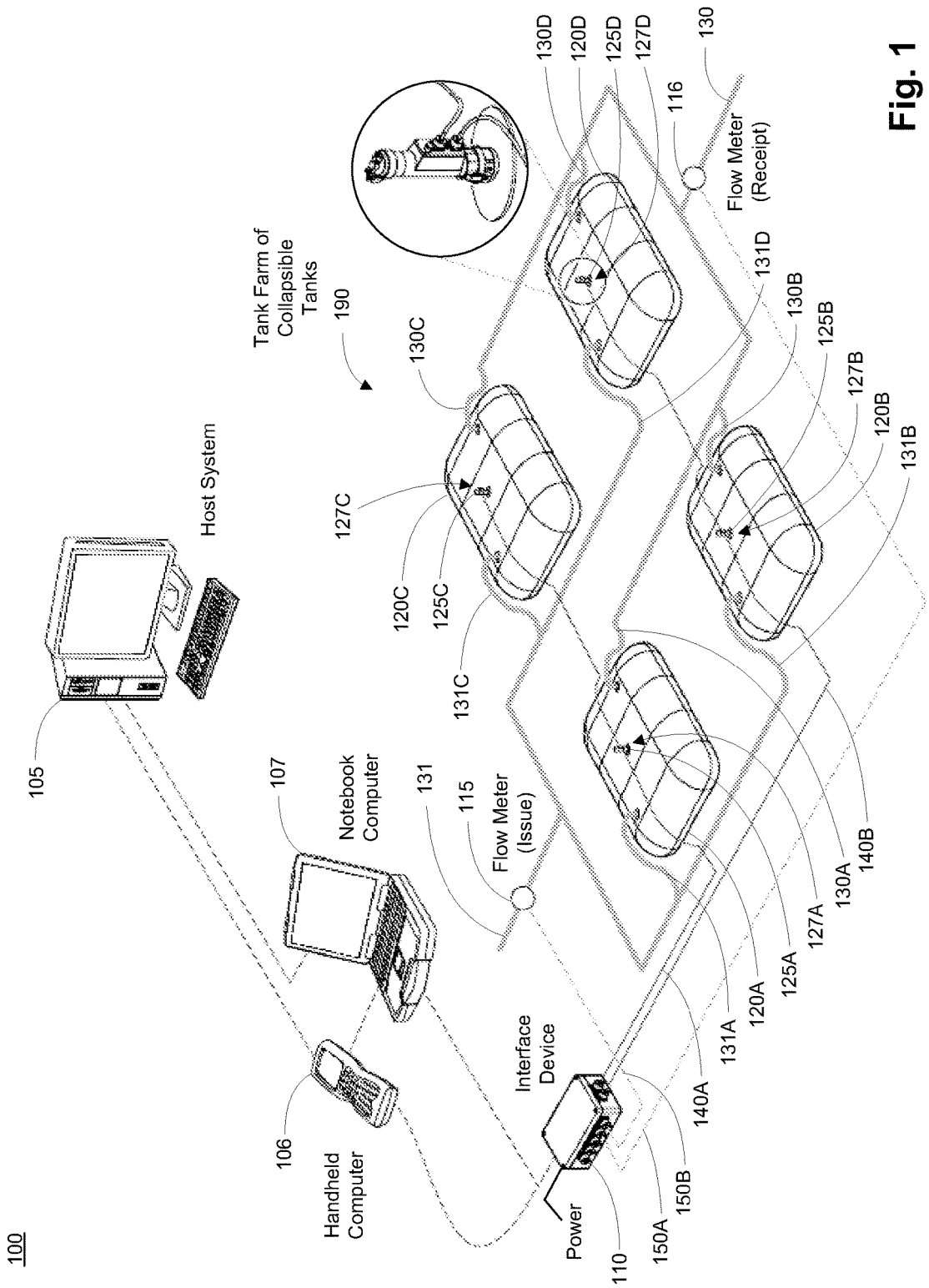
FIG. 1 depicts a system for measuring and automating inventory of fuel stored in collapsible tanks in accordance with certain exemplary embodiments.

Turning now to the drawings, in which like numerals indicate like elements throughout the figures, aspects of the exemplary embodiments are described in detail. FIG. 1 depicts a system 100 for measuring and automating an inventory of fuel stored in collapsible tanks 120A-120D in accordance with certain exemplary embodiments. Although this exemplary embodiment will be described in the context of storing fuel in collapsible tanks 120A-120D, those skilled in that art would appreciate that the system 100 can be used to manage the inventory of any type of product, including water and other chemicals.

Referring to FIG. 1, the system 100 includes a host system 105. The host system 105 can comprise a computer or server having fuel inventory management software (not shown) stored and executed thereon. The fuel inventory management software consolidates and manages fuel inventory data from multiple fuel storage locations and tank farms, such as tank farm 190 having the collapsible tanks 120A-120D. The host system 105 typically includes one or more memory storage devices for storing the fuel inventory management software and inventory data. Although not shown in FIG. 1, the host system 105 can be coupled to a network, such as a local area network ("LAN"), wide area network ("WAN"), or the Internet. In a network embodiment, the fuel inventory management software can expose the fuel inventory data to other computers or systems connected to the network.

Typically, the collapsible tanks 120A-120D are installed in remote or temporary locations, such as a tactical location for military operations. In these remote or temporary locations, it can often be difficult to provide continuous power or a secure network infrastructure for the host system 105 or other devices at the location. Thus, the host system 105 may be installed remote from the location of the collapsible tanks 120A-120D. For example, in a military embodiment, the host system 105 may be installed at a nearby base. To obtain fuel inventory data for use by the host system 105, a user may employ a mobile host device, such as a handheld computer 106 or a notebook computer 107, comprising a computer processor and one or more memory storage devices.

The mobile host devices 106 and 107 can comprise a fuel management software application (not shown) that can interact with an interface device 110 to obtain, display, and store fuel data, such as fuel inventory data, strap table data, process measurement data, and transactional movement data (e.g., receipts and issues). The fuel management software application can provide a user interface at the mobile host devices 106 and 107 for an operator to query process measurement sensors 127 A-127D located at the collapsible tanks 120A-120D and to activate a learning process for the collapsible tanks 120A-120D. This learning process is described in detail below with reference to FIG. 13. After the operator has received data on the mobile host device 106 or 107 via the interface device 110, the operator can take the mobile host device 106 or 107 to the host system 105 to synchronize data with the fuel inventory management software executing on the host device 105. In certain exemplary embodiments, the handheld computer 106 can be connected to a cradle (not shown) that receives the handheld computer 106 for synchronization.

Figure 8:
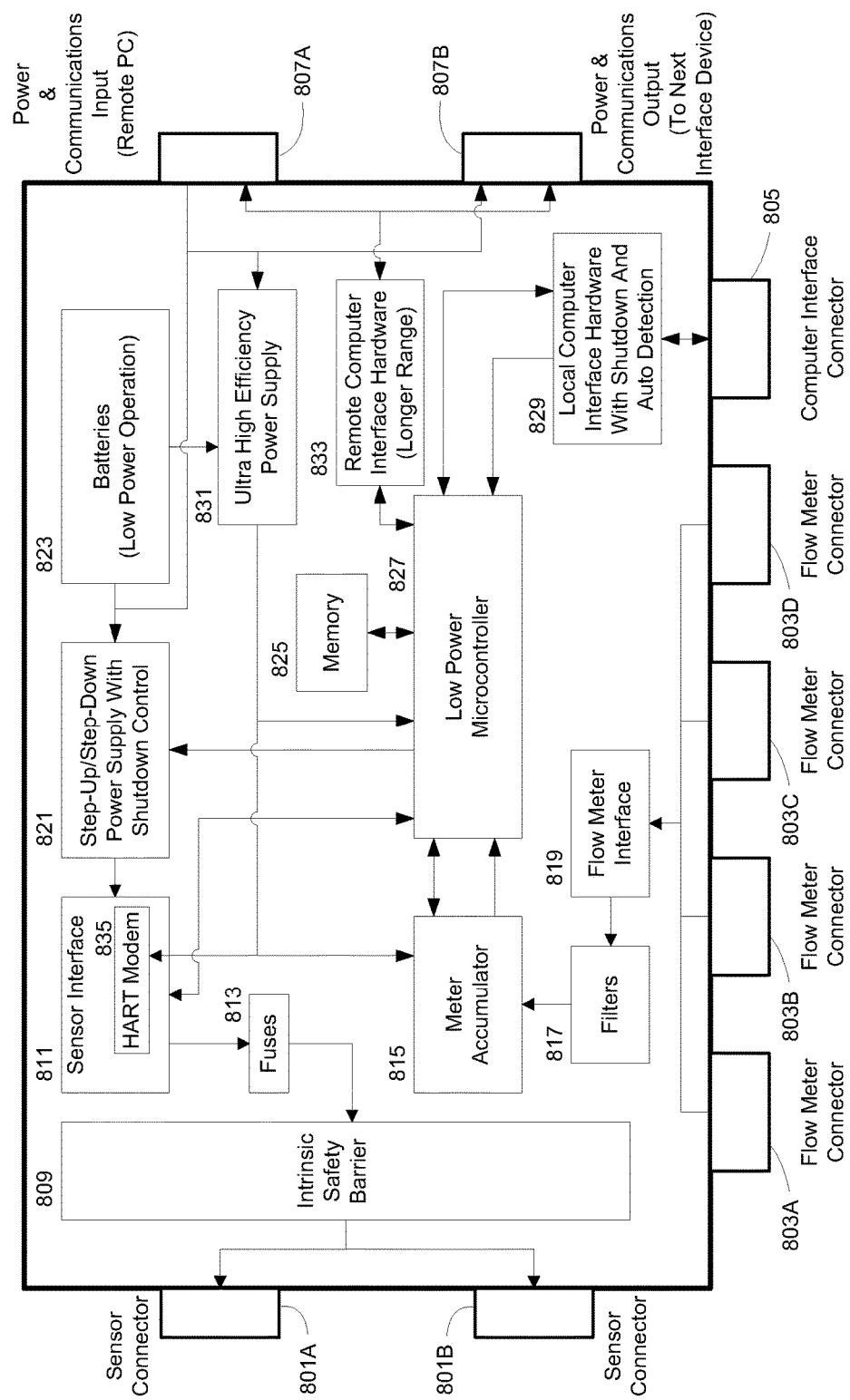
FIG. 8 is a block diagram depicting some of the components of the interface device of FIG. 1 in accordance with certain exemplary embodiments.

The interface device 110, which is discussed in more detail below with reference to FIGS. 8 through 22, comprises hardware and software modules for interfacing with the mobile host devices 106 and 107, with sensors 127A-127D installed at the collapsible tanks 120A-120D, and with flow meters 115 and 116. Although in this exemplary embodiment the interface device 110 is connected to four sensors 127A-127D and two flow meters 116 and 117, one skilled in the art would appreciate that the interface device 110 could be connected to any number of sensors 127A-127D and to any number of flow meters 116 and 117. Additionally, the hardware and functions of the interface device 110 can be integrated with the sensors 127A-127D. Thus, each sensor 127 A-127D can comprise an interface device 110. [0049] The interface device 110 can comprise a microcontroller based interface unit designed for low power and extreme temperature operation that allows the interface device 110 to be installed in remote locations. Referring briefly to FIG. 8, the interface device 110 can include an energy storage device, such as batteries 823 that can power the interface device 110 when the interface device 110 is not connected to an external power source. The interface device 110 can also include means for extreme low power conservation discussed in detail below with reference to FIGS. 8 and 22. For example, several of the hardware systems of the interface device 110 are shut down while the interface device 110 is idle.

Referring back to FIG. 1, each of the collapsible tanks 120A-120D in the tank farm 190 is connected to a tank inlet line 130A-130D, respectively, to receive fuel via a main supply line 130. The main supply line 130 can include a device (not shown), such as a valve manifold, that allows for selecting one of the collapsible tanks 120A-120D to receive fuel. Each of the collapsible tanks 120A-120D is also connected to a tank discharge line 131A 131D, respectively, for dispensing fuel via a main discharge line 131. Similar to the main inlet line 130, the main discharge line 131 can include a valve manifold (not shown) or other device for selecting a collapsible tank 120A-120D to dispense fuel from.

Figure 3:
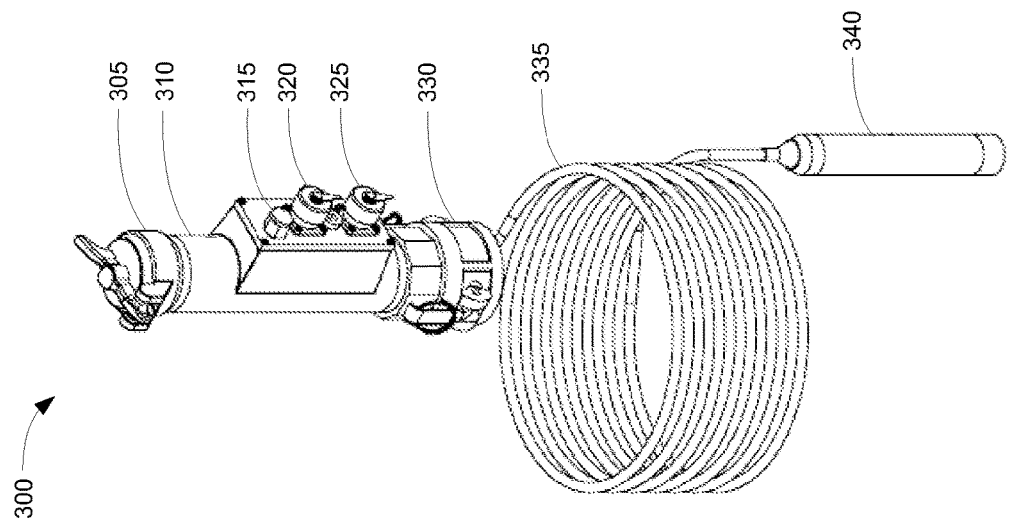
FIG. 3 depicts a vent pipe having an integral pressure and temperature sensor attached thereto in accordance with certain exemplary embodiments.
Figure 2:
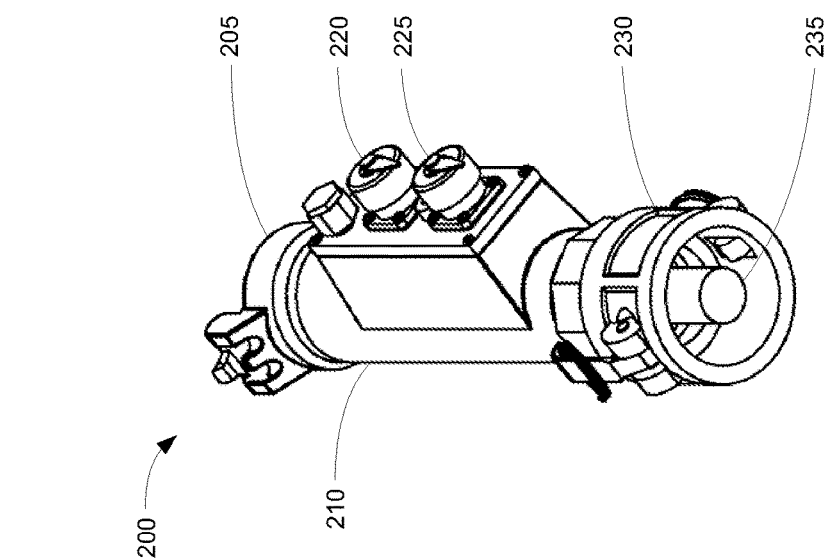
FIG. 2 depicts a vent pipe having a nonintrusive level detecting sensor disposed therein in accordance with certain exemplary embodiments.

Each of the collapsible tanks 120A-120D includes a removable vent pipe 125A-125D, respectively. The vent pipes 125A-125D can include a sensor 127 A-127D, respectively, for measuring a process variable, such as level, pressure, or temperature, of the fuel stored in the respective collapsible tank 120A-120D. Typically, vent pipes are installed on a fuel storage tank to relieve any vapor pressure that may accumulate inside the tank. The exemplary vent pipes 125A-125D provide this pressure relief functionality in addition to having a sensor 127 A-127D for providing process measurement capabilities. FIGS. 2 and 3 provide exemplary vent pipes 200 and 300, respectively, that vent pipes 125A-125D can be embodied as.

Referring briefly to FIG. 2, this Figure depicts a vent pipe 200 having a nonintrusive level detecting sensor, generally designated by reference numeral 235, disposed therein in accordance with certain exemplary embodiments. The level sensor 235 can comprise a radar level detector or an ultrasonic level detector for measuring the level of fuel in a collapsible tank 120A-120D. Referring briefly to FIG. 3, this Figure depicts a vent pipe 300 having an integral pressure and temperature sensor 340 attached thereto in accordance with certain exemplary embodiments. The integral sensor 340 can measure the temperature and pressure of fuel in a collapsible tank 120A-120D. Preferably, each of the sensors 235 and 340 comprises a transmitter for transmitting process measurement data to another device, such as the interface device 110 of FIG. 1.

Referring back to FIG. 1, the sensors 127A-127D of the vent pipes 125A 125D are connected to the interface device 110 via power and communications cables 140A and 140B. Specifically, the interface device 110 is connected to the sensors 127A and 127C via the cable 140A and the interface device 110 is connected to the sensors 127B and 127D via the cable 140B. The interface device 110 can provide power to the sensors 127A-127D and can receive process measurements from the sensors 127A-127D via the cables 140A and 140B. The interface device 110 controls the power to the sensors 127A-127D and typically powers the sensors 127 A-127D down unless a measurement is being performed to conserve power. In certain exemplary embodiments, the cables 140A and 140B comprise a two-wire interface that is compatible with Highway Addressable Remote Transmitter ("HART") interface and protocol.

The interface device 110 is also connected to two flow meters 115 and 116 via communications cables 150A and 150B respectively. The flow meter 116 is disposed on the main supply line 130 to meter the flow of fuel into the collapsible tanks 120A-120D. The flow meter 116 is disposed on the main discharge line 131 to meter the flow of fuel out of the collapsible tanks 120A-120D. Advantageously, the flow meters 115 and 116 are light weight and rugged so that the flow meters 115 and 116 can easily be moved and installed in temporary or remote locations. In certain exemplary embodiments, the flow meters 115 and 116 can interact with the interface device 110 using a serial or pulse based interface.

During a learning process, the interface device 110 can interact with one of the flow meters 115 or 116 to measure the volume of fuel being added to or removed from the collapsible tanks 120A-120D. The interface device 110 can also interact with the sensor 127 A 127D at the collapsible tank 120A-120D that is the subject of the learning process to obtain process measurements corresponding to the volume measurements obtained from the flow meters 115 and 116.

The learning process is used to develop a strap table for the collapsible tanks 120A-120D. A strap table is a table that includes multiple entries, each entry having a process value, such as a pressure or a level, and a volume that has been determined via the learning process to correspond to that process value. For example, using the learning process on collapsible tank 120A, it may be determined that a level of 48" measured by a level sensor, such as level sensor 235 of FIG. 2, corresponds to a volume of 30,000 gallons of fuel in the collapsible tank 120A. In another example where pressure is used as the process measurement, the learning process may find that a pressure of 19.3 PSI corresponds to a volume of 20,000 liters of fuel in the collapsible tank 120A.

After being generated, the strap table can be used in conjunction with a current process measurement to determine the current volume of fuel stored in the collapsible tank 120A-120D. If the current process measurement lies between two entries in the strap table, an interpolation process can be used to accurately determine the current volume of fuel in the collapsible tank. The interpolation process can comprise conventional interpolation calculations, such as a linear interpolation or a polynomial interpolation.

When a collapsible tank, such as collapsible tank 120A, is first installed at a location, an operator may have the option of using a generic strap table developed for the type or model of tank or can use the interface device 110 to generate a strap table for the collapsible tank 120A via the learning process. The interface device 110 can also update the strap table for the collapsible tank 120A periodically to account for any changes to the collapsible tank 120A or any changes to the terrain of an installation environment of the strap table 120A. The learning process is described in more detail below with reference to FIG. 13. As described below, with reference to FIG. 16, the strap table can be adjusted to account for any settling of the collapsible tank 120A-120D after storing fuel.

FIG. 23 depicts a portion of an exemplary strap table 2300 for a collapsible tank 120A-120D in accordance with certain exemplary embodiments. Referring to FIG. 23, this exemplary strap table 2300 includes three columns of measurements, a process measurement 2305, a volume measurement 2310, and a temperature measurement 2315. The strap table 2300 also includes entries 2330-2355 for every 100 liters of fuel supplied to the collapsible tank 120A-120D.

FIG. 2 depicts a vent pipe 200 having a nonintrusive level detecting sensor, generally designated by reference numeral 235, disposed therein in accordance with certain exemplary embodiments. As briefly discussed above, the level sensor 235 can comprise a radar level detector or an ultrasonic level detector for measuring the level of fuel in a collapsible tank, such as the collapsible tanks 120A-120D of FIG. 1. Referring to FIGS. 1 and 2, the vent pipe 200 includes two electrical connectors 220 and 225 disposed on an outside wall of the vent pipe 200. Although not shown in FIG. 2, the level sensor 235 can comprise a transmitter for transmitting level measurements made by the level sensor 235 to another device, such as the interface device 110. This level transmitter can be electrically coupled to one or both of the electrical connectors 220 and 225 via a connection inside the vent pipe 200. The level transmitter can receive power from the interface device 110 via a communication and power cable 140A or 140B attached at one end to one of the electrical connectors 220 or 225 and attached at the other end to the interface device 110. The transmitter can also provide the interface device 110 with a level measurement via this communication and power cable. Although not shown, the vent pipe 200 can also comprise a temperature sensor connected thereto for measuring the temperature of the fuel stored in the collapsible tank 120A-120D.

The vent pipe 200 can include a quick connect coupling, such as a cam and groove coupling 230, that allows for quick and secure connection to a collapsible tank 120A-120D. The vent pipe 200 also includes a relief vent cap 205 for relieving any vapor pressure that may accumulate inside the collapsible tank 120A-120D that the vent pipe 200 is installed on. If the vapor pressure reaches a certain level, the relief vent cap 205 will open to allow some of the vapor to exit the collapsible tank 120A-120D and thus lower the vapor pressure inside the collapsible tank 120A-120D.

FIG. 3 depicts a vent pipe 300 having an integral pressure and temperature sensor 340 attached thereto in accordance with certain exemplary embodiments. The integral sensor 340 can include a pressure sensing element for measuring pressure and a temperature sensing element for measuring temperature of fuel stored in a collapsible tank 120A-120D of FIG. 1. Referring to FIGS. 1 and 3, the integral sensor 340 can include a transmitter (not shown) that transmits the pressure and temperature measurements to another device, such as the interface device 110 of FIG. 1, via a power and communication cable 335. The vent pipe 300 includes two electrical connectors 320 and 325 disposed on an outside wall of the vent pipe 300. The cable 335 is attached at one end to the integral sensor 340 and at the other end to one or both of the electrical connectors 320 and 325. The integral sensor 340 can receive power from the interface device 110 via the communication and power cable 140A or 140B attached at one end to one of the electrical connectors 320 and 325 and attached at the other end to the interface device 110. The transmitter of the integral sensor 340 can also provide the interface device 110 with pressure and temperature measurements via this communication and power cable 140A or 140B.

Typically, the cable 335 is highly flexible, so that the cable 335 does not disturb the position of the integral sensor 340 during filling or emptying the collapsible tank 120A 120D that the integral sensor 340 is installed in. The vent pipe 300 can include a strain relief clamp (not shown) to clamp a portion of the cable 335 to an inside wall of the vent pipe 300. The strain relief clamp can protect the electrical connectors 320 and 325 and the cable 335 from being damaged by forces acting on the cable 335.

The integral sensor 340 is installed in a collapsible tank 120A-120D by feeding the integral sensor 340 and the cable 335 into the collapsible tank 120A-120D. When installed in the collapsible tank 120A-120D, the integral sensor 340 rests freely on the bottom of the collapsible tank 120A-120D. In certain exemplary embodiments, the sensing elements of the integral sensor are contained in a sealed, substantially cylindrical, metal tube that is capable if being submerged indefinitely in liquids. In certain exemplary embodiments, the cable 335 is sealed and comprises a jacket compatible with military fuels that does not degrade when submerged in the fuels.

The vent pipe 300 can include a quick connect coupling, such as a cam and groove coupling 330, that allows for quick and secure connection onto a collapsible tank 120A-120D. The vent pipe 300 also includes a relief vent cap 305 for relieving any vapor pressure that may accumulate inside the collapsible tank 120A-120D that the vent pipe 300 is installed on. If the vapor pressure reaches a certain level, the relief vent cap 305 will open to allow some of the vapor to exit the collapsible tank 120A-120D and thus lower the vapor pressure inside the collapsible tank 120A-120D.

The vent pipe 300 also includes a vent 315 having a filter (not shown). The vent 315 provides a reference to atmospheric pressure for the pressure sensing element of the integral sensor 340. This reference is typically necessary for accurate pressure measurements as barometric pressure changes. A reference tube (not shown) can extend from the vent 315 to the integral sensor 340 via the cable 335. The filter of the vent 315 prevents particulates from blocking this reference tube.

FIGS. 4-7 illustrate the movement of a collapsible tank 120 and the cable 335 of the integral sensor 340 of FIG. 3 in accordance with certain exemplary embodiments. Referring to FIGS. 4 and 5, the collapsible tank 120 is partially filled with fuel. In this partially filled state, the cable 335 is curled inside the collapsible tank 120 and the integral sensor 340 rests at the bottom of the collapsible tank 120. Referring to FIGS. 6 and 7, when the collapsible tank 120 is filled with fuel, the collapsible tank 120 expands and bulges and the top of the collapsible tank 120 rises. The cable 335, is unwound as the collapsible tank 120 is filled, and in the illustration of FIG. 6, the cable 335 is substantially straight. The integral sensor 340 remains resting on the bottom of the collapsible tank 120 even after the collapsible tank 120 is filled.

FIG. 8 is a block diagram depicting some of the components of the interface device 110 of FIG. 1 in accordance with certain exemplary embodiments. Referring to FIGS. 1 and 8, the interface device 110 can include a processing device, such as microcontroller 827. The microcontroller 827 can comprise a central processing unit ("CPU") (not shown) and supporting components, such as onboard memory (not shown) and a clock (not shown) for the CPU. In alternative embodiments, a microprocessor or other processing device can be used in place of the microcontroller 827.

The microcontroller 827 can execute computer readable instructions stored in computer readable memory, such as memory 825. The process flow of some of these instructions are described in detail below with reference to FIGS. 9-22. These process flows include interfacing with process measurement sensors 127A-127D, host devices 106 and 107, and flow meters 115 and 116. These process flows also include performing calculations and tank learning processes. The memory 825 can comprise volatile memory, such as random access memory ("RAM"), and non-volatile memory, such as read only memory ("ROM"), electrically erasable read only memory, ("EEPROM"), and flash memory.

As shown in FIG. 1, the interface device 110 can be connected to an external power source to provide power to the various hardware systems contained in the interface device 110. This exemplary interface device 110 also includes an internal power system comprising one or more batteries 823 for use in remote locations when external power may not be available. In certain exemplary embodiments, the batteries 823 comprise lithium batteries as lithium batteries have very high energy densities and can operate at extreme temperatures. The batteries 823 provide energy to a step-up/step-own power supply 821 and an ultra high efficiency power supply 831. Both power supplies 821 and 831 can comprise DC-DC (direct current) power supplies designed for high efficiency.

The ultra high efficiency power supply 831 provides power to the microcontroller 827, the memory 825, local computer interface hardware 829, remote computer interface hardware 833, a meter accumulator circuit 815, and a HART modem 835. In certain exemplary embodiments, the ultra high efficiency power supply 831 provides a 3.3 volt supply to these components. The ultra high efficiency power supply 831 features a low-current sleep mode to maintain efficiency under light-load conditions. This sleep mode feature helps to maintain the life of the batteries 823. Typically, during the majority of operation life of the interface device 110, the interface device 110 will operate in an idle or low power mode. While in this low power mode, most of the hardware systems will be shut down or stopped. During the low power mode, the CPU of the microcontroller 827 can be stopped and the HART modem 835 can be powered down. Stopping or shutting down these hardware systems constitutes a very light load on the ultra high efficiency power supply 831. The ultra high efficiency power supply 831 can then operate in a sleep mode, drawing very little current from the batteries 823. A meter accumulator circuit 815, which can accumulate pulses from the flow meters 115 and 116 in a pulse interface embodiment, is typically one of the few systems that will remain powered by the ultra high efficiency power supply 831. If pulses are not present at an input to the pulse accumulator circuit 815, power consumption by the interface device 110 is nearly zero.

The step-up/step-down power supply 821 provides power to the sensors 127A-127D via a sensor interface circuit 811. In certain exemplary embodiments, the step-up/step-down power supply 821 provides a stable 18 volts to the sensors 127A-127D. Internal control circuitry (not shown) within the step-up/step-down power supply 821 can monitor system conditions and convert from a single switch buck operation to a dual switch bridged operation when appropriate. Thus, the step-up/step-down power supply 821 can seamlessly change between step-down and step-up voltage conversion. This conversion feature allows the step-up/step-down power supply 821 to maintain the stable voltage for the sensors 127A-127D, since the batteries 823 may swing from above 18 volts when fresh to below 18 volts when nearly discharged. Typically, this step-up/step-down power supply 821 is only activated when a mobile host device 106 or 107 is connected to the interface device 110 and the interface device 110 is obtaining a process measurement from one of the sensors 127A-127D.

The local computer interface hardware 829 is connected to a computer interface connector 805. The computer interface connector 805 can receive a cable (not shown) for connecting the interface device 110 to a mobile host device 106 or 107. The local computer interface hardware 829 can comprise a serial interface circuit, such as an RS-232 interface circuit, that can include a low power option and automatic power down capabilities. When the local computer interface hardware 829 does not sense a valid signal, such as an RS-232 signal, on the computer interface connector 805, the local computer interface hardware 829 can power down to conserve power. When a valid signal, such as a signal provided by the handheld computer 106, is connected to the computer interface connector 805, the local computer interface hardware 829 can power up and begin operation. The local computer interface hardware 829 can also transmit a signal to the CPU of the microcontroller 827 to become active and begin communicating when a valid signal is connected. In certain exemplary embodiments, the local computer interface hardware 829 can comprise a wireless communications interface, such as Bluetooth.

The remote computer interface hardware 833 is connected to a power and communications input 807A and a power and communications output 807B. Both the power and communications input 807A and output 807B can receive a cable (not shown) connecting the interface device 110 to a remote computer, such as a computer in a control room, or to another interface device (not shown). The remote computer interface hardware 833 can receive power for the interface device 110 and communications signals from a remote computer at the input 807A. The remote computer interface hardware 833 can provide power to another interface device via the output 807B. The remote computer interface hardware 833 can comprise a serial interface circuit, such as an RS-485 interface circuit, that can include a low power option and automatic power down capabilities. Typically, the remote computer interface hardware 833 remains in a low power mode unless a remote computer or interface device is connected to either the input 807A or the output 807B. The remote computer interface hardware 833 can also transmit a signal to the CPU of the microcontroller 827 to become active and begin communicating when a remote computer or interface device is connected to the input 807A or output 807B.

The sensor interface circuit 811 receives power from the step-up/step-down power supply 821 and provides this power to the sensors 127A-127D connected to sensor connectors 801A and 801B. As shown in FIG. 1, the sensors 127A and 127C are connected to the interface device 110 via cable 140A. This cable 140A can be attached to either sensor connector 801A or 801B. Likewise, the sensors 127B and 127D are connected to the interface device 110 via cable 140B. This cable 140B can be attached to either sensor connector 801A or 801B.

In this exemplary embodiment, the sensor interface circuit 811 also comprises a HART modem 835 for communicating with the sensors' 127A-127D transmitters. Alternatively, the sensor interface circuit 811 could include other communication interfaces and protocols, such as serial, analog (frequency or voltage), Ethernet, Inter-Integrated Circuit ("I2C"), Foundation Fieldbus, Serial Peripheral Interface ("SPI"), Profibus, MODBUS, or any other suitable interface and protocol. The HART modem 835 includes a frequency-shift-keying (FSK) modulator demodulator ("MODEM") circuit to generate and receive an alternating current ("AC") analog signal used to transport digital communications data.

In certain exemplary embodiments, the interface device 110 can include an intrinsic safety barrier 809 that limits the amount of energy capable of reaching the sensors 127A-127D from the interface device 110. The intrinsic safety barrier 809 is particularly useful when the sensor 127A-127D is installed in a hazardous environment, such as in a collapsible tank 120A-120D that is used for storing fuel or other explosive chemicals. The intrinsic safety barrier 809 can include parallel zener diodes (not shown) to clamp any unsafe rise in supply voltage. The intrinsic safety barrier 809 can also include one or more resistors (not shown) to limit current that can be supplied to the sensors 127A-127D. The intrinsic safety barrier 809 can also include one or more fuses (not shown) to stop current flow to the sensors 127A-127D if an over-current situation continues. Between the intrinsic safety barrier 809 and the sensor interface circuit 811, is one or more user accessible fuses 813. Typically, these fuses 813 have a lower current rating than the fuses contained in the intrinsic safety barrier 809 so that the fuses 813 will "blow" prior to the fuses in the intrinsic safety barrier 809.

The interface device 110 includes a flow meter interface 819 for interfacing with flow meters 115 and 116 connected to flow meter connectors 803A-803D. In this exemplary embodiment, there are four flow meter connectors 803A-803D and only two flow meters 115 and 116. Thus, two of the flow meter connectors 803A-803D may not be used. As shown in FIG. 1, the flow meter 115 is connected the interface device 110 via cable 150B. This cable 150B can be attached to either of flow meter connectors 803A-803D. Likewise, the flow meter 116 is connected the interface device 110 via cable 150A. This cable 150A can be attached to either of flow meter connectors 803A-803D.

The flow meter interface 819 can include a serial communications interface to interface with smart flow meters or a pulse interface for standard flow meters. As discussed above with reference to FIG. 1, the flow meters 115 and 116 are used during the learning process of FIG. 13. This learning process is performed either while a collapsible tank 120A-120D is being filled or emptied. Depending on the size of the collapsible tank 120A-120D, the learning cycles can be time consuming. In order to conserve power and to conserve the batteries 823, the flow meter interface 819 is designed to operate at low power as often as possible during the learning process.

In a serial interface embodiment, the flow meters 115 and 116 maintain volume information. The interface device 110 can periodically query the flow meters 115 and 116 to determine the volume of fuel in the collapsible tank 120A-120D that is the subject of a learning process. Once a predetermined volume change has occurred, the interface device 110 can activate the sensor 127A-127D at the subject collapsible tank 120A-120D to make a process measurement. The interface device 110 can then store the process measurement in a nonvolatile memory of memory 825. Between queries to the flow meter 115 or 116, the CPU of the microcontroller 827 executes using a low frequency crystal oscillator (not shown) to conserve power.

In a pulse interface embodiment, volume information is maintained in the meter accumulator 815 as a total number of pulse signals generated by the flow meter 115 or 116 and received by the meter accumulator 815. The meter accumulator 815 is typically always active during a learning process as missing a pulse from the flow meter 115 or 116 can create an error in the volume information. The meter accumulator 815 can include a compare register (not shown) that can be used to generate a signal to the CPU of the microcontroller 827 once the pulse total has reached a desired value. The CPU of the microcontroller 827 calculates a number of pulses representing the next volume change, stores this value in the compare register of the meter accumulator 815, and shuts down to conserve power while waiting for the compare to occur. Once a predetermined volume change has occurred, the interface device 110 activates the sensor 127A-127D at the subject collapsible tank 120A-120D to make a process measurement. The interface device 110 can then store the process measurement in a nonvolatile memory of memory 825.

The interface device 110 can include filters 817 disposed between the flow meter interface 819 and the meter accumulator 815 to support a pulse interface embodiment. When using a pulse interface for volume measurement, the pulse signals may be generated by a mechanical means, such as a switch, relay, or contactor. These type of devices may exhibit contact bouncing which manifests as several short duration pulses at very high frequency. The filters 817 attenuate the bounces and square up the pulse signals. In certain exemplary embodiments, the filters 817 comprise low-pass filters followed by wave shaping logic gates.

The interface device 110 can execute a group of hardware drivers, interrupt service routines, database management functions, data processing routines, and high level communication protocol handling functions. A key component of the interface device's 110 software functions is a real-time, pre-emptive, embedded multi-tasking operating system (not shown). This operating system can mitigate the successful and timely execution of several software tasks. Some of theses tasks are described below with reference to FIGS. 9-22. The operating system can provide services for managing and allocating memory resources. The operating system can also provide services for signaling other tasks and data transfer between tasks.

In certain exemplary embodiments, the interface device 110 can comprise a general computer or server having a processor, such as a CPU, computer readable memory, and a computer readable storage medium having computer readable program code embodied therein. The computer readable program code can comprise computer readable program code for performing the functions described below in the process flows of FIGS. 9-22. The processor can execute the computer readable program code via the computer readable memory. In a computer or server embodiment, the interface device 110 can comprise or be coupled to the hardware components described above.

Figure 9:
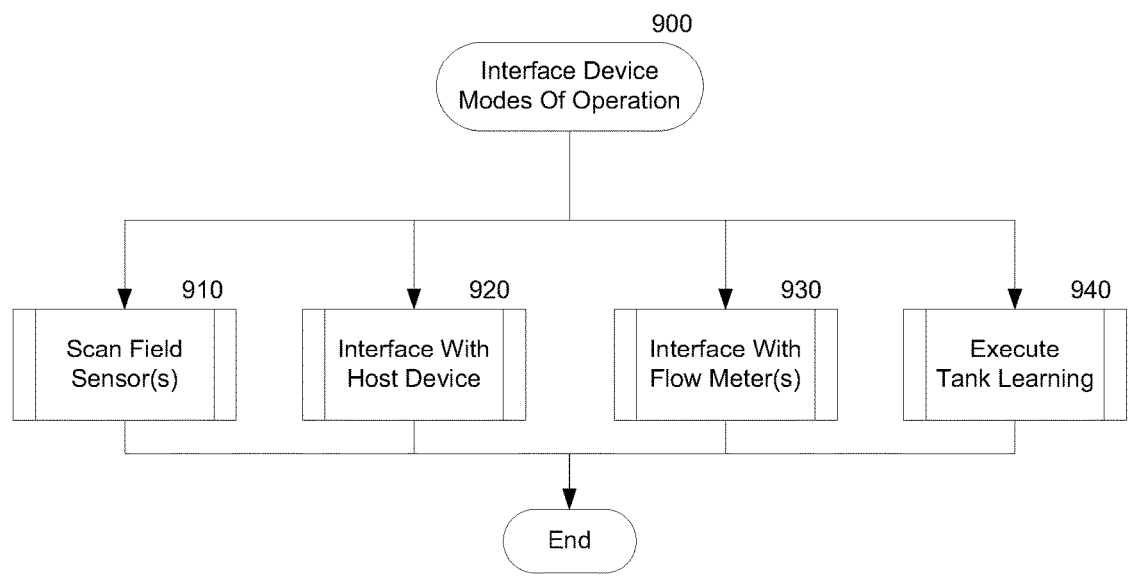
FIG. 9 is a flow chart depicting modes of operation of the interface device of FIG. 1 in accordance with certain exemplary embodiments.

FIG. 9 is a flow chart 900 depicting modes of operation of an interface device 110 in accordance with certain exemplary embodiments. Referring to FIGS. 1, 8, and 9, the exemplary interface device 110 comprises a field sensor scanning mode 910 (See FIG. 10), a host device interface mode 920 (See FIG. 11), a flow meter interface mode 930 (See FIG. 12), and a tank learning mode 940 (See FIG. 13). The interface device 110 can actively execute each of these modes of operation 910-940 continuously in parallel. Those skilled in the art would appreciate that the interface device 110 can include many more modes and that the interface device 110 is not limited to these four modes of operation only.

Certain steps in the processes described below must naturally precede others for the present invention to function as described. However, the present invention is not limited to the order of the steps described if such order or sequence does not alter the functionality of the present invention. That is, it is recognized that some steps may be performed before or after other steps without departing from the scope and spirit of the present invention.

Figure 10:
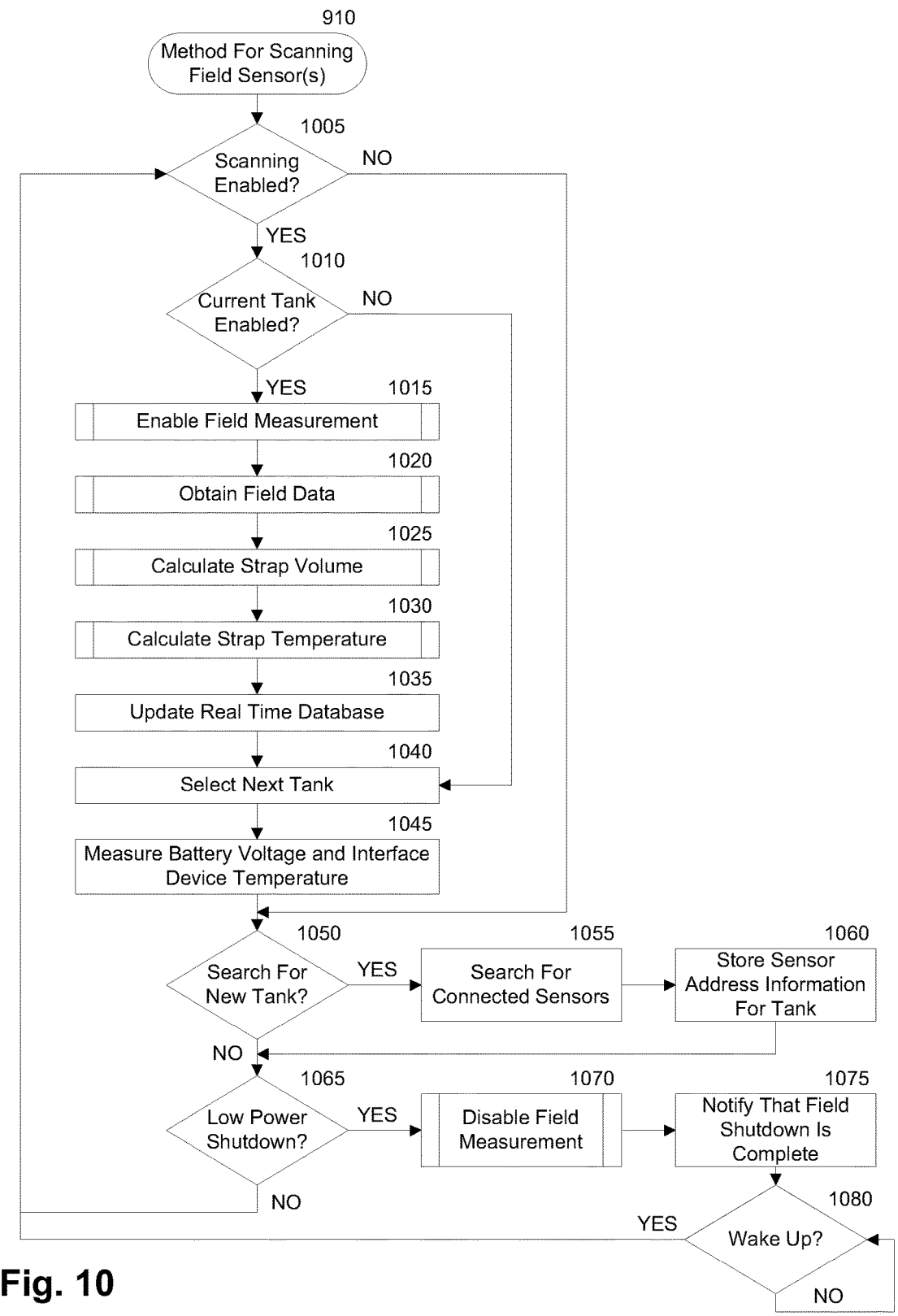
FIG. 10 is a flow chart depicting a method for scanning field sensors in accordance with certain exemplary embodiments.

FIG. 10 is a flow chart depicting a method 910 for scanning field sensors 127A-127D in accordance with certain exemplary embodiments. Referring to FIGS. 1, 8, and 10, in step 1005, the interface device 110 determines if field scanning is enabled at the interface device 110. Field scanning can be enabled by an operator connecting a mobile host device 106 or 107 to the interface device 110 or when an operator queries a sensor 127A-127D via the mobile host device 106 or 107. Field scanning can also be enabled during the performance of a learning process to make a process measurement. If field scanning is enabled, the method 910 proceeds to step 1010. Otherwise the method 910 proceeds to step 1050.

In step 1010, the interface device 110 determines if a current collapsible tank 120A-120D is enabled at the interface device 110. Typically, a collapsible tank 120A-120D is enabled after a successful search conducted by the interface device 110 finds a sensor 127A-127D for the collapsible tank 120A-120D. The collapsible tank 120A-120D can also be enabled by an operator via the mobile host device 106 or 107. If the current collapsible tank 120A-120D is enabled, the method 910 proceeds to step 1015. Otherwise, the method 910 proceeds to step 1040.

In step 1015, the interface device 110 enables a field process measurement by the sensor 127A-127D at the current collapsible tank 120A-120D. The interface device 110 enables power to the sensor 127A-127D of the current collapsible tank 120A-120D and enables the sensor interface 811. Step 1015 is described in more detail below with reference to FIG. 18.

In step 1020, the interface device 110 obtains field process data from the sensor 127A-127D at the current collapsible tank 120A-120D and saves the process data in a database in memory 825. Step 1020 is described in more detail below with reference to FIG. 19.

In step 1025, the microcontroller 827 of the interface device 110 calculates a current strap volume of fuel in the current collapsible tank 120A-120D using the obtained process data and a strap table for the current collapsible tank 120A-120D. The microcontroller 827 can perform a linear interpolation and a higher order polynomial interpolation on entries in the strap table to determine the strap volume corresponding to the process data. Step 1025 is described below in more detail with reference to FIG. 14.

In step 1030, the micro controller 827 calculates a current strap temperature for the fuel stored in the current collapsible tank 120A-120D using the strap volume calculated in step 1025 and the strap table. Step 1030 is described below in more detail with reference to FIG. 15.

In step 1035, the microcontroller 827 updates a real time database stored in the memory 825 with the obtained process data, the calculated strap volume, and the calculated strap temperature. This database can be uploaded to the mobile host device 106 and 107 during a synchronization for transfer to the host system 105.

In step 1040, the interface device 110 selects the next collapsible tank 120A-120D. For example, if the current collapsible tank is 120A, the microcontroller 827 can select the collapsible tank 120B as the next collapsible tank to scan.

In step 1045, the interface device 110 measures voltage on the batteries 823 and temperature of the interface device 110 to ensure that there is adequate power and that the interface device 110 is maintaining a temperature in a desired range.

In step 1050, the microcontroller 827 determines whether to search for a new tank. For example, if the interface device 110 is being commissioned at the tank farm 190 for the first time, the interface device 110 may need to search for connected sensors. In another example, a new tank may be installed at the tank farm 190 having a sensor not recognized by the interface device 110. In yet another example, an existing sensor may be replaced with an unrecognized sensor. The interface device 110 may periodically search for new collapsible tanks or may be prompted to do so by an operator via the mobile host device 106 or 107. If the microcontroller 827 determines to search for a new collapsible tank, the method 910 proceeds to step 1055. Otherwise, the method proceeds to step 1065.

In step 1055, the microcontroller 827 prompts the sensor interface 811 to scan for connected sensors 127A-127D. The sensor interface 811 can communicate information relating to any found sensors 127A-127D to the microcontroller 827. This information can include a sensor name, network address, such as a MAC address, and any other relevant information. In step 1060, the microcontroller 827 stores the information in the memory 825. If a new collapsible tank was found, the interface device 110 can also enable that tank in step 1060.

In step 1065, the microcontroller 827 determines whether to switch to a low power mode. If all of the sensors 127A-127D have been scanned and there are no active learning processes being performed, the interface device 110 can switch to the low power mode. If the microcontroller 827 determines to switch to the low power mode, the method 910 proceeds to step 1070. Otherwise, the method 910 returns to step 1005.

In step 1070, the microcontroller 110 disables field measurement by disabling the sensor interface 811 and disabling power to the sensors 127A-127D. Step 1070 is described in more detail below with reference to FIG. 20.

In step 1075, the microcontroller 827 notifies the mobile host device 106 or 107 via the local computer interface hardware 829 that the field shutdown is complete. In step 1080, the microcontroller 827 determines whether to wake up and return to a normal, active mode. The microcontroller 827 can wake up when a mobile host device 106 or 107 is sensed at the local computer interface hardware 829. The microcontroller 827 can also wake up if a learning process is being performed and a process measurement is required. If the microcontroller 827 determines to wake up, the method 910 returns to step 1005. Otherwise, the method 910 returns to step 1080 and remains in the low power mode.

Figure 11:
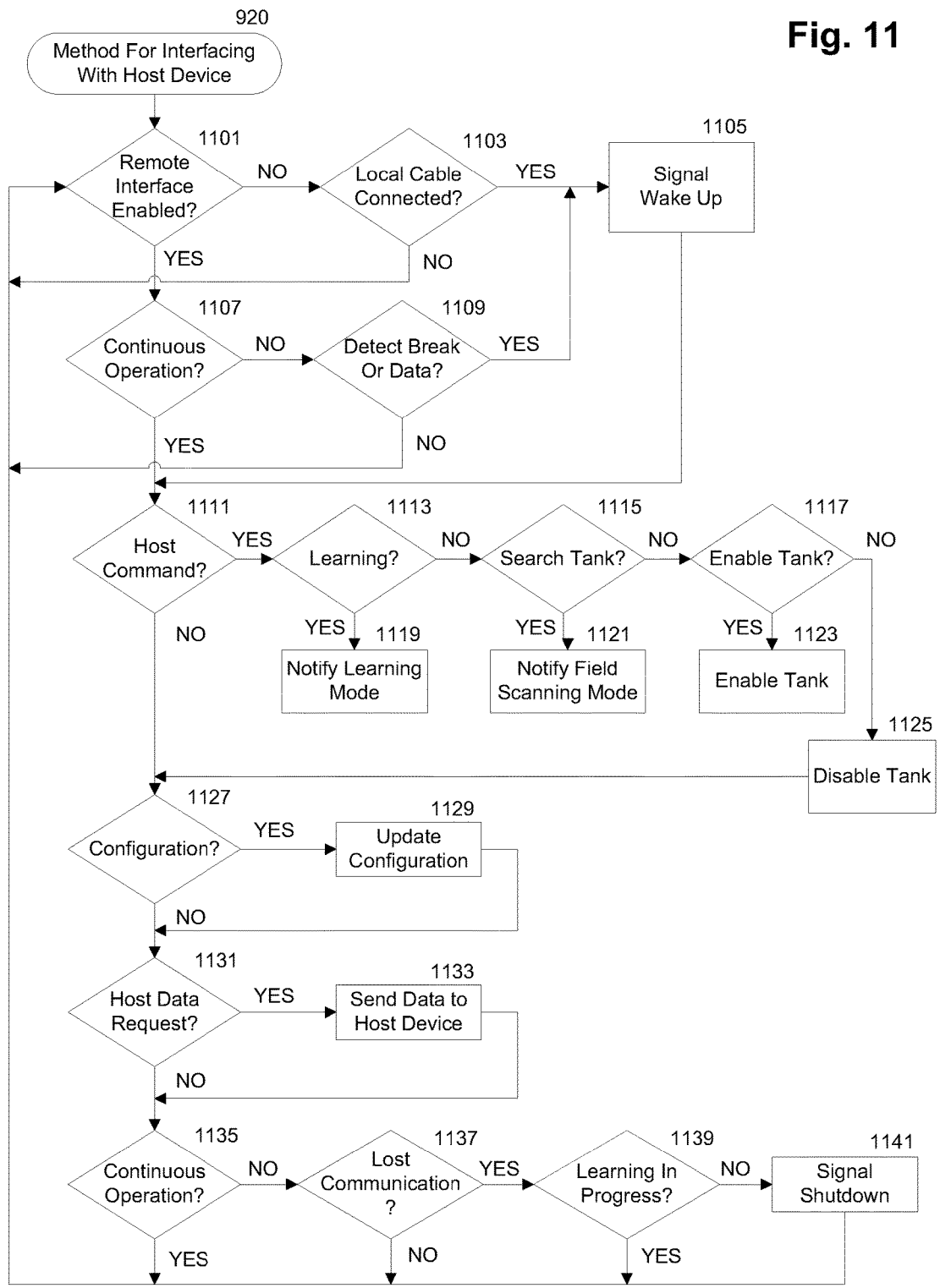
FIG. 11 is a flow chart depicting a method for interfacing with a host device in accordance with certain exemplary embodiments.

FIG. 11 is a flow chart depicting a method 920 for interfacing with host devices 106 and 107 in accordance with certain exemplary embodiments. Referring to FIGS. 1, 8, and 11, in step 1101, the micro controller 827 of the interface device 110 determines if the remote computer interface hardware 833 is enabled. If the remote computer interface hardware 833 is enabled, the method 920 proceeds to step 1107. Otherwise, the method 920 proceeds to step 1103.

In step 1103, the microcontroller 827 determines if a local cable is connected to the computer interface connector 805 via the local computer interface hardware 829. If a local cable is connected, the method 920 proceeds to step 1105. Otherwise, the method 920 returns to step 1101.

In step 1107, if the interface device 110 is in a continuous operation, the method 920 proceeds to step 1111. Otherwise, the method 920 proceeds to step 1109. Typically, an interface device 110 is placed in a continuous operation when there is an external power source supplying power to the interface device 110 and there is either a need for continuous real time data or a learning process is being performed.

In step 1109, with the interface device 110 in a non-continuous operation, the microcontroller 827 determines if a communications break or data is detected at the remote computer interface hardware 833. A communications break can be a string of null data sent from a remote computer or a remote interface device to the interface device 110 prior to sending actual data. If the interface device 110 is in a low power or idle mode and communications is initiated without sending a communications break, the interface device 110 may miss some of the initial data while waking from the low power mode. If a break or data is detected at the remote computer interface hardware 833, the method 920 proceeds to step 1105. Otherwise, the method 920 returns to step 1101.

In step 1105, the microcontroller 827 transmits a command to the hardware systems contained in the interface device 110 to wake up and switch to a normal, active mode. This step is made in response to a local cable being connected to the computer interface connector 805 in step 1103 or a break or data being detected at the remote computer interface hardware 833 in step 1109.

In step 1111, the microcontroller 827 determines whether a host command has been received to perform an action for one of the collapsible tanks 120A-120D. For example, an operator can issue a command to the interface device 110 via a mobile host device 106 or 107. In another example, an operator can issue a command from a remote computer connected to the power and communications input 807A. If a host command has been received, the method 920 proceeds to step 1113. Otherwise, the method 920 proceeds to step 1127.

In step 1113, the microcontroller 827 determines if the received command is a command to perform a learning process for one of the collapsible tanks 120A-120D. If the command is to perform a learning process, the method 920 proceeds to step 1119 and the microcontroller 827 calls for the learning mode 940 to become active for that collapsible tank 120A-120D. Otherwise, the method 920 proceeds to step 1115.

In step 1115, the microcontroller 827 determines if the received command is a command to search for one of the collapsible tanks 120A-120D. If the command is to search for one of the collapsible tanks 120A-120D, the method 920 proceeds to step 1121 and the microcontroller 827 calls for the field scanning mode 910 to become active. Otherwise, the method 920 proceeds to step 1117.

In step 1117, the microcontroller 827 determines if the received command is a command to enable one of the collapsible tanks 120A-120D. If the command is to enable one of the collapsible tanks 120A-120D, the method 920 proceeds to step 1123 and the microcontroller 827 enables the one collapsible tank 120A-120D. Otherwise, the method 920 proceeds to step 1125. In step 1125, the micro controller 827 disables the one collapsible tank 120A-120D.

In step 1127, the microcontroller 827 determines if configuration data has been received. Configuration data can include tank size, initial volume in a collapsible tank 120A-120D prior to a learning process, end volume for completing the learning process, relaxed volume used to calculate a relaxation curve, type of sensor 127A-127D installed at the collapsible tanks 120A-120D, pulse ratios (number of pulses per unit volume from the flow meters 115 and 116), meter factor (additional scalar to configure data from the flow meters 115 and 116), and tank enable/disable. If the configuration data has been received, the method 920 proceeds to step 1129. Otherwise, the method 920 proceeds to step 1131. In step 1129, the microcontroller 827 updates the configuration data in memory 825.

In step 1131, the microcontroller 827 determines if a request for data has been received from one of the mobile host devices 106 or 107 or from a remote computer connected to the power and communications input 807A. If a request for data has been received, the method 920 proceeds to step 1133. Otherwise, the method 920 proceeds to step 1135. In step 1133, the microcontroller 827 obtains the requested data from memory 825 and transmits the requested data to the device that requested the data.

In step 1135, if the interface device 110 is in a continuous operation, the method 920 returns to step 1101. Otherwise, the method 920 proceeds to step 1137. In step 1137, the microcontroller 827 determines if communication with the mobile host device 106 or 107 or with the remote computer has been lost. If communication has been lost, the method 920 proceeds to step 1139. Otherwise, the method 920 returns to step 1101.

In step 1139, the microcontroller 827 determines if a learning process is currently in progress. If a learning process is in progress, the method 920 returns to step 1101. Otherwise, the method 920 proceeds to step 1141. In step 1141, the microcontroller 827 sends a command to the hardware systems of the interface device 110 to shut down or go into a low power mode. Typically, the flow meter interface 819 and the meter accumulator 815 will remain in a normal, active mode of operation.

Figure 12:
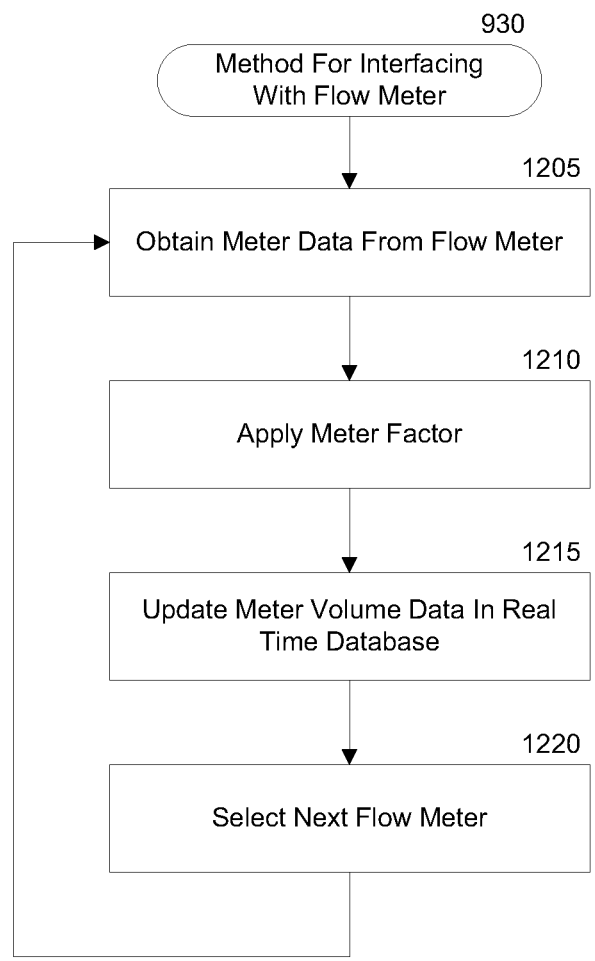
FIG. 12 is a flow chart depicting a method for interfacing with a flow meter in accordance with certain exemplary embodiments.

FIG. 12 is a flow chart depicting a method 930 for interfacing with the flow meters 115 and 116 of FIG. 1 in accordance with certain exemplary embodiments. Typically, the interface device 110 interfaces with the flow meters 115 and 116 during the performance of a tank learning process only. Referring to FIGS. 1, 8, and 12, in step 1205, the flow meter interface 819 of the interface device 110 obtains meter data from the flow meter 115 or 116. As described above with reference to FIG. 8, the meter data can comprise a volume stored at the flow meter 115 or 116, or a pulse signal. In step 1210, if the meter data is a pulse, the microcontroller 827 can apply a meter factor to the pulse based on the volume of fuel that a pulse corresponds to. In step 1215, the microcontroller 827 updates the meter data in a real time database stored in memory 825. In step 1220, if there are more than one flow meters 115 and 116 connected to the interface device 110, the interface device 110 can select a next flow meter 115 or 116 and the method 930 returns to step 1205 to obtain meter data for the next flow meter 115 or 116.

Figure 13:
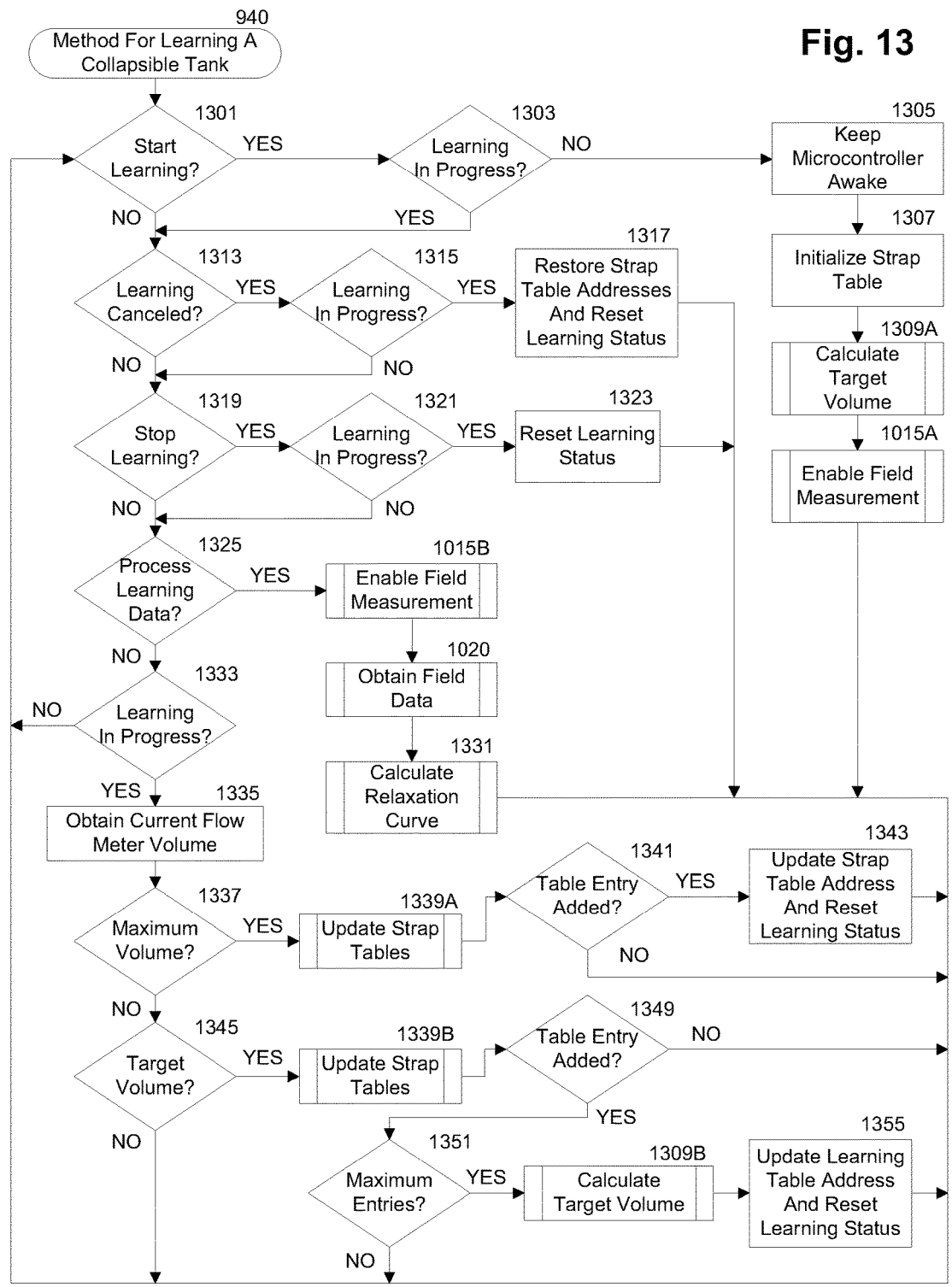
FIG. 13 is a flow chart depicting a method for learning a collapsible tank in accordance with certain exemplary embodiments.

FIG. 13 is a flow chart depicting a method 940 for learning a collapsible tank in accordance with certain exemplary embodiments. This method 940 will be described in relation to collapsible tank 120A. Referring to FIGS. 1, 8, and 13, in step 1301, the microcontroller 827 determines whether to start a learning process for collapsible tank 120A. An operator can issue a command to start a learning process via one of the mobile host devices 106 or 107. Or, the learning process can be started automatically by the microcontroller 827 based on a time period since the previous learning process has been performed for the collapsible tank 120A. Thus, the interface device 110 can automatically recalibrate strap data for the collapsible tank 120A based on a time period. If the microcontroller 827 determines that the learning process should be started, the method 940 proceeds to step 1303. Otherwise, the method 940 proceeds to step 1313.

In step 1303, the microcontroller 827 determines whether a learning process is already in progress for the collapsible tank 120A by checking a learning status associated with the collapsible tank 120A. If the learning process is already in progress, the method 940 proceeds to step 1313. Otherwise, the method 940 proceeds to step 1305.

In step 1305, the microcontroller 827 is maintained in a normal, active mode where the microcontroller 827 cannot go into a low power mode. In step 1307, the microcontroller 827 initializes a new strap table for the collapsible tank 120A and stores the strap table in the memory 825. The microcontroller 827 can also obtain a current volume of fuel in the collapsible tank 120A (e.g., from one of the flow meters 115 or 116 or via the meter accumulator 815) and store this volume in the first entry in the strap table. The microcontroller 827 can store a memory address corresponding to the strap table's location in the memory 825 in a cache (not shown) on board the microcontroller 827. The microcontroller 827 also sets the learning status for the collapsible tank 120A to indicate that a learning process is in progress.

In step 1309A, the microcontroller 827 calculates a target volume for the next entry in the strap table. The microcontroller 827 calculates this target volume by calculating the difference between an end volume of fuel for ending the learning process and a current volume of fuel in the collapsible tank 120A to obtain a remaining volume. The remaining volume is then divided by the number of remaining strap table entries to obtain a delta volume. This delta volume is then added to the current volume to obtain the target volume. After calculating the target volume, the microcontroller 827 stores the target volume in the memory 825. Step 1309A is described in more detail below with reference to FIG. 21.

In step 1015A, the interface device 110 enables a field process measurement by the sensor 127A. The interface device 110 enables power to the sensor 127A and enables the sensor interface 811. Step 1015A is described in more detail below with reference to FIG. 18.

In step 1313, the microcontroller 827 determines whether a command has been received to cancel the learning process. If a command to cancel learning has been received, the method 940 proceeds to step 1315. Otherwise, the method 940 proceeds to step 1319.

In step 1315, the microcontroller 827 determines if a learning process IS III progress. If a learning process is in progress, the method 940 proceeds to step 1317. Otherwise, the method 940 proceeds to step 1319. In step 1317, if a previous strap table exists for the collapsible tank 120A, the microcontroller 827 restores the previous strap table addresses so that the previous strap table is used to determine strap volume for the collapsible tank 120A. The microcontroller 827 also resets the learning status for the collapsible tank 120A to indicate that a learning process is not in progress.

In step 1319, the microcontroller 827 determines whether a command has been received to stop the learning process prior to reaching the end volume for the learning process. An operator can end the learning process via a remote host device 106 or 107. The strap table generated up until the stop command is received can then be used by the interface device 110 to determine strap volume for the collapsible tank 120A. If a command to stop learning has been received, the method 940 proceeds to step 1321. Otherwise, the method 940 proceeds to step 1325. In step 1323, the microcontroller 827 resets the learning status for the collapsible tank 120A to indicate that a learning process is not in progress.

In step 1325, the microcontroller 827 determines whether a command to process learning data has been received. If a command to process learning data has been received, the method 940 proceeds to step 1015B. Otherwise, the method 940 proceeds to step 1333.

In step 1015B, the interface device 110 enables a field process measurement by the sensor 127A. The interface device 110 enables power to the sensor 127A and enables the sensor interface 811. Step 1015A is described in more detail below with reference to FIG. 18.

In step 1020, the interface device 110 obtains field process data from the sensor 127A and saves the process data in a database in memory 825. Step 1020 is described in more detail below with reference to FIG. 19.

In step 1331, the microcontroller 827 calculates a relaxation curve for the strap table. Typically, the relaxation curve is calculated after allowing the collapsible tank 120A to settle for a period of time with fuel stored therein after the learning process is complete. Step 1331 is described in more detail below with reference to FIG. 16.

In step 1333, the microcontroller 827 determines if a learning process is in progress. If a learning process is in progress, the method 940 proceeds to step 1335. Otherwise, the method 940 returns to step 1301.

In step 1335, the microcontroller 827 obtains current flow meter volume. As discussed above with reference to FIG. 8, the interface device 110 can have a pulse interface or a serial interface. In a serial interface embodiment, the interface device 110 can obtain the current flow meter volume from the flow meter 115 or 116 used in the learning process. In a pulse interface embodiment, the current flow meter volume is maintained in the meter accumulator 815.

In step 1337, the microcontroller 827 determines if the maximum volume or end volume for the learning process has been reached. If the learning process is performed while filling the collapsible tank 120A, the end volume can be the total capacity of the collapsible tank 120A or only a portion of the capacity. Similarly, if the learning process is performed while emptying the collapsible tank 120A, the end volume can be zero (i.e. empty) or at a preset volume. The microcontroller 827 can compare the current flow meter volume to a final flow meter volume stored in memory to make this determination. If the maximum or end volume has been reached, the method 940 proceeds to step 1339A to add the final strap table entry. Otherwise, the method 940 proceeds to step 1345.

In step 1339A, the microcontroller 827 updates the strap table for the collapsible tank 120A by obtaining process measurement data from the sensor 127A and storing this process measurement data in the strap table with the current flow meter volume. Step 1339A is described in more detail below with reference to FIG. 17.

In step 1341, the micro controller 827 determines whether the strap table entry was added in step 1339A. If the strap table entry was added, the method 940 proceeds to step 1343. Otherwise the method 940 returns to step 1301. In step 1343, the microcontroller 827 updates the strap table address and resets the learning status for the collapsible tank 120A to indicate that a learning process is not in progress.

In step 1345, the microcontroller 827 determines if the target volume has been reached by comparing the current flow meter volume to the target volume stored in the memory 825. If the target volume has been reached, the method 940 proceeds to step 1339B to add an intermediate table entry in the strap table. Otherwise, the method 940 returns to step 1301.

In step 1339B, the microcontroller 827 updates the strap table for the collapsible tank 120A by obtaining process measurement data from the sensor 127A and storing this process measurement data in the strap table with the current flow meter volume. Step 1339B is described in more detail below with reference to FIG. 17.

In step 1349, the micro controller 827 determines whether the strap table entry was added in step 1339B. If the strap table entry was added, the method 940 proceeds to step 1351. Otherwise the method 940 returns to step 1301.

In step 1351, the microcontroller 827 determines if a maximum number of strap table entries has been reached. If the maximum number of strap table entries has been reached, the method 940 proceeds to step 1309B. Otherwise, the method 940 returns to step 1301.

In step 1309B, the microcontroller 827 calculates the target volume for the next entry in the strap table. After calculating the target volume, the microcontroller 827 stores the target volume in the memory 825. Step 1309B is described in more detail below with reference to FIG. 21.

In step 1355, the microcontroller 827 updates the strap table address and resets the learning status for the collapsible tank 120A to indicate that a learning process is not in progress.

Figure 14:
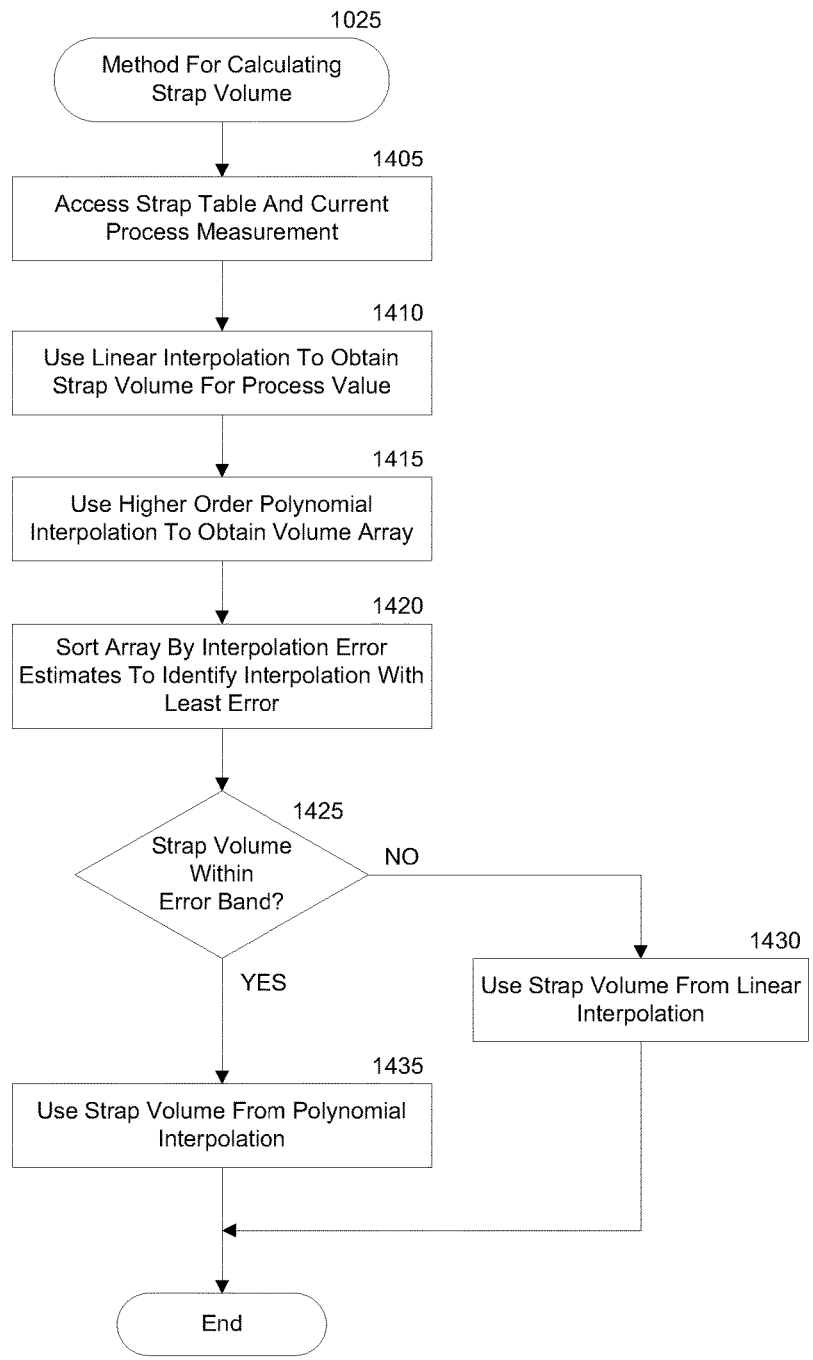
FIG. 14 is a flow chart depicting a method for calculating a strap volume in accordance with certain exemplary embodiments.

FIG. 14 is a flow chart depicting a method 1025 for calculating a strap volume in accordance with certain exemplary embodiments. Referring to FIGS. 1, 8, and 14, in step 1405, the micro controller 827 accesses a strap table for a collapsible tank 120A-120D and a current process measurement for the collapsible tank 120A-120D from memory 825.

In step 1410, the microcontroller 827 uses linear interpolation to determine a current strap volume of fuel in the collapsible tank 120A-120D based on the current process measurement. For example, with reference to FIG. 23, if the current process measurement is 16.0 PSI, the microcontroller 827 may calculate the current strap volume using Equation 1 below:

$$CurrentVolume = V_1 + (P_c - P_1)\frac{V_2 - V_1}{P_2 - P_1} \quad \text{Equation 1}$$

In Equation 1, $P_1$ and $V_1$ are the process measurement and metered volume, respectively, in the strap table 2300 entry 2335 having the first process measurement less than the current process measurement, which is indicated in Equation 1 by $P_c$. $P_2$ and $V_2$ are the process measurement and metered volume, respectively, in the strap table 2300 entry 2340 having the first process measurement greater than the current process measurement $P_c$. Thus, if the current process measurement is 16.0 PSI, the microcontroller 827 would calculate a strap volume of 150 liters using Equation 1.

In step 1415, the micro controller 827 generates and solves one or more higher order polynomial interpolations to obtain an array of strap volumes corresponding to the current process measurement. For example, the microcontroller 827 may generate an array of strap volumes comprising third, fourth, and fifth order polynomial interpolations. These higher order polynomial interpolations can typically provide a more accurate strap volume than the linear interpolation. The microcontroller 827 also estimates an error for each polynomial interpolation.

In one exemplary embodiment, this polynomial interpolation process is based on Neville's algorithm. In this embodiment, using an ordered table of process variables $PV_i$ and volumes $V_i$, linear interpolation is used between two "parent" points to obtain "descendant" points. The various descendant points form a "tableau" with "ancestors" on the left leading to a single "descendant" on the extreme right. For example, a tableau comprising four process variables $PV_1$-$PV_4$ with corresponding volumes $V_1$-$V_4$, respectively, is provided below.

| | | | | |
|---|---|---|---|---|
| $PV_1$: | $V_1$ | | | |
| | | $V_{12}$ | | |
| $PV_2$: | $V_2$ | | $V_{123}$ | |
| | | $V_{23}$ | | $V_{1234}$ |
| $PV_3$: | $V_3$ | | $V_{234}$ | |
| | | $V_{34}$ | | |
| $PV_4$: | $V_4$ | | | |

Neville's algorithm provides a recursive way of filling in the numbers in the tableau one column at a time, from left to right. The algorithm is based on a relationship between a "daughter" V and its two "parents" in the tableau. Equation 2 shown below can be used to fill the numbers in the tableau.

$$V_{i(i+1)\ldots(i+m)} = \frac{(PV - PV_{i+m})V_{i(i+1)\ldots(i+m-1)} + (PV_i - PV)V_{(i+1)(i+2)\ldots(i+m)}}{PV_i - PV_{i+m}} \quad \text{Equation 2}$$

In Equation 2, variable "m" represents the column level in the tableau. Small differences between parents and daughters can be tracked using Equations 3 and 4 below.

$$C_{m,i} = V_{i\ldots(i+m)} - V_{i\ldots(i+m-1)} \quad \text{Equation 3:}$$

$$D_{m,i} = V_{i\ldots(i+m)} - V_{(i+1)\ldots(i+m)} \quad \text{Equation 4:}$$

Using Equations 2-4, Equations 5 and 6 below can be derived.

$$D_{m+1,i} = \frac{(PV_{i+m+1} - PV)(C_{m,i+1} - D_{m,i})}{PV_i - PV_{I+m+1}} \quad \text{Equation 5}$$

$$C_{m+1,i} = \frac{(PV_i - PV)(C_{m,i+1} - D_{m,i})}{PV_i - PV_{i+m+1}} \quad \text{Equation 6}$$

At each level m, the C's and D's are the corrections that make the interpolation one order higher. The final answer (i.e., calculated strap volume) is equal to the sum of any Vi plus a set of C's and/or D's that form a path through the family tree to the rightmost daughter. After each column in the tableau is complete, one of the corrections, C or D, is chosen to add to an accumulating value V (i.e., which path to take through the tableau-forking up or down). Typically, this is done in such a way as to take the most "straight line" route through the table to its apex. This route keeps partial approximations centered on the target PV. The last C or D added to V is an indication of the error, and its absolute value can be used as the error estimate.

In step 1420, the microcontroller 827 sorts the polynomial interpolations by estimated error to indentify the strap volume corresponding to the polynomial interpolation having the least estimated error.

Figure 24:
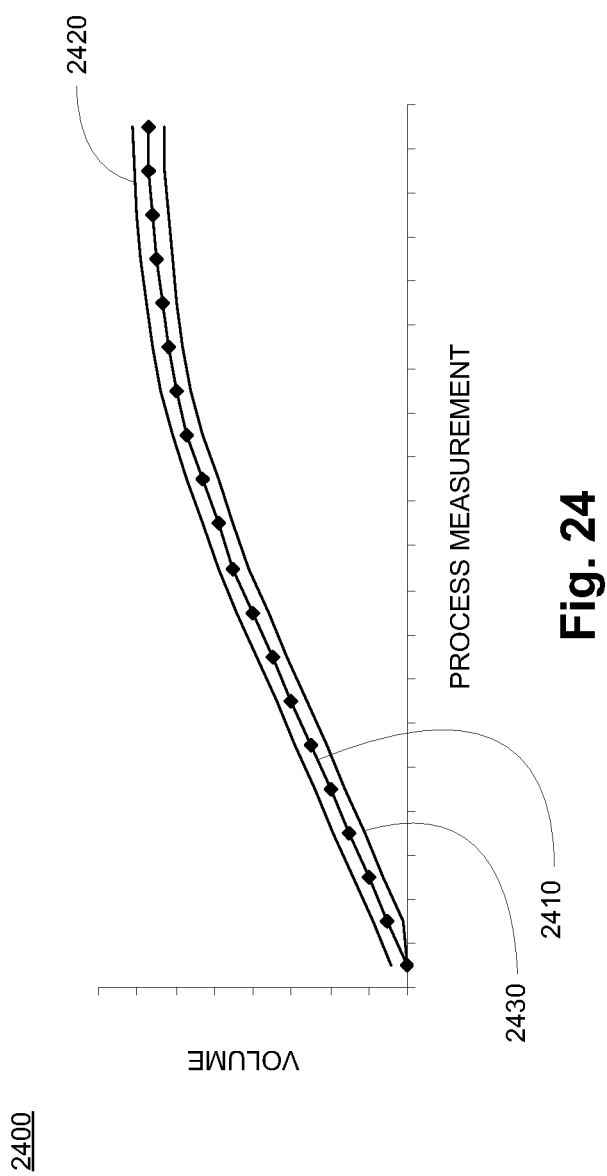
FIG. 24 is a chart depicting a linear interpolation of a strap table in accordance with certain exemplary embodiments.

In step 1425, the microcontroller 827 determines whether the strap volume of the polynomial interpolation having the least error is within a predefined error band related to the linear interpolation to ensure that there were no errors in generating the polynomial interpolations. For example, FIG. 24 is a chart 2400 depicting a linear interpolation 2410 of a strap table in accordance with certain exemplary embodiments. With reference to FIG. 24, the chart 2400 illustrates an exemplary error band for the linear interpolation 2410 defined by an upper boundary 2420 and a lower boundary 2430 around the linear interpolation 2410. For clarity, the error band is exaggerated. If the strap volume of the polynomial interpolation having the least error is greater than the upper boundary 2420 or less than the lower boundary 2430 at the current process measurement, then the strap volume is considered to be outside the error band.

Referring back to FIG. 14, if the strap volume having the least error is within the error band, then the method 1025 proceeds to step 1435 where the microcontroller 827 uses this strap volume in place of the strap volume obtained from the linear interpolation. If the strap volume having the least error is not within the error band, then the method 1025 proceeds to step 1430 where the microcontroller 827 uses the strap volume obtained from the linear interpolation.

Figure 15:
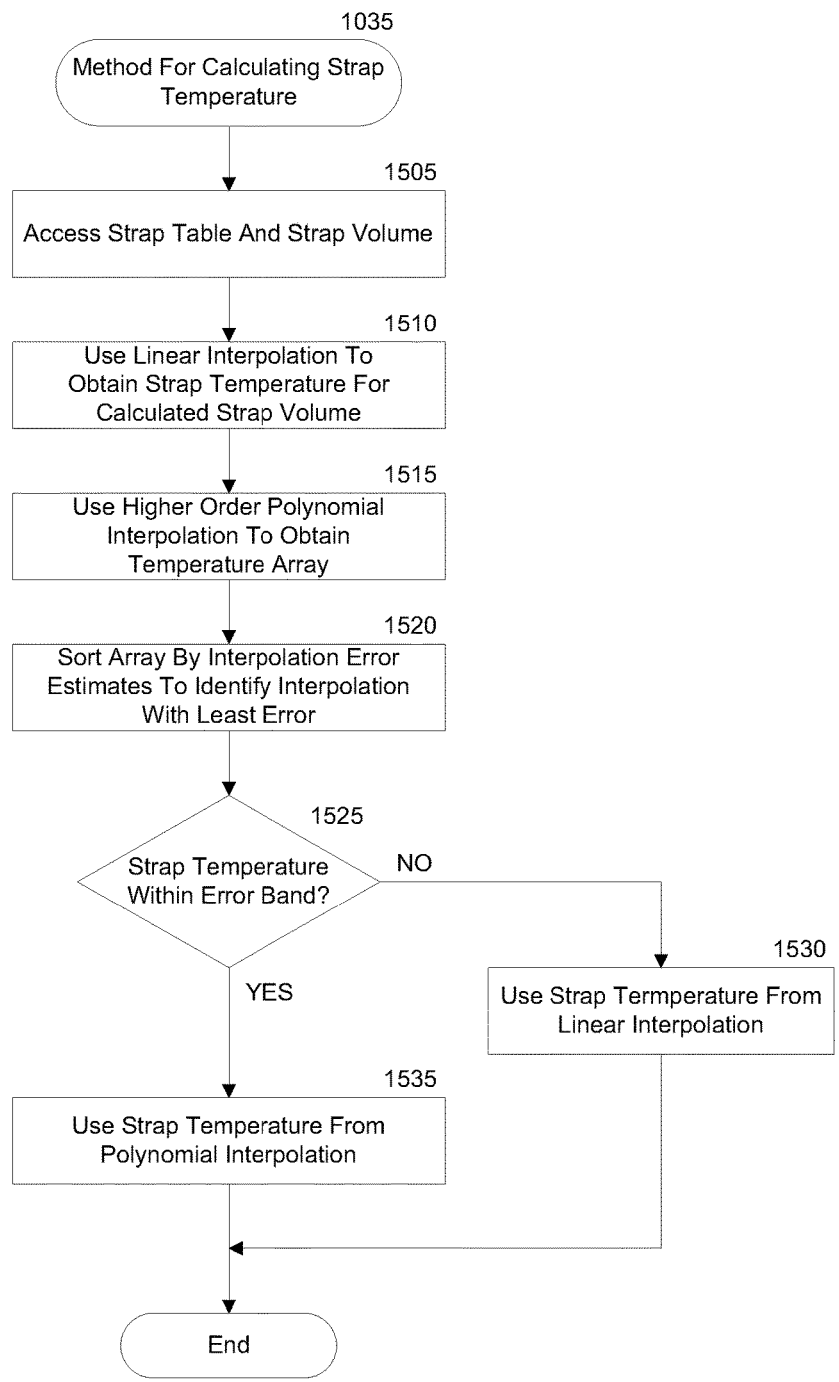
FIG. 15 is a flow chart depicting a method for calculating a strap temperature in accordance with certain exemplary embodiments.

FIG. 15 is a flow chart depicting a method 1035 for calculating a strap temperature in accordance with certain exemplary embodiments. Referring to FIGS. 1, 8, and 15, in step 1505, the microcontroller 827 accesses a strap table for a collapsible tank 120A-120D and a calculated strap volume for the collapsible tank 120A-120D from memory 825.

In step 1510, the microcontroller 827 uses linear interpolation to determine a current strap temperature of fuel in the collapsible tank 120A-120D based on the calculated strap volume. For example, with reference to FIG. 23, if the calculated strap volume is 150 liters, the microcontroller 827 may calculate the current strap temperature using Equation 7 below:

$$CurrentTemperature = \frac{(V_s - V_1)*(T_2 - T_1)}{V_2 - V_1} + T_1 \quad \text{Equation 7}$$

In Equation 7, $T_1$ and $V_1$ are the temperature measurement and metered volume, respectively, in the strap table 2300 entry 2335, having the first volume less than the calculated strap volume, which is indicated in Equation 7 by $V_s$. $T_2$ and $V_2$ are the temperature measurement and metered volume, respectively, in the strap table 2300 entry 2340, having the first process measurement greater than the calculated strap volume $V_s$. Thus, if the calculated strap volume is 150 liters, the microcontroller 827 would calculate a strap temperature of 24.15° C. using Equation 7.

In step 1515, the micro controller 827 generates and solves one or more higher order polynomial interpolations to obtain an array of strap temperatures corresponding to the calculated strap volume. The microcontroller 827 also estimates an error for each polynomial interpolation. Similar to step 1415 of FIG. 14 described above, this polynomial interpolation process can be based on Neville's algorithm.

In step 1520, the microcontroller 827 sorts the polynomial interpolations by estimated error to indentify the strap temperature corresponding to the polynomial interpolation having the least estimated error.

In step 1525, the microcontroller 827 determines whether the strap temperature of the polynomial interpolation having the least error is within a predefined error band related to the linear interpolation to ensure that there were no errors in generating the polynomial interpolations. If the strap temperature having the least error is within the error band, then the method 1035 proceeds to step 1535 whereby the microcontroller 827 uses this strap temperature in place of the strap temperature obtained from the linear interpolation. If the strap temperature having the least error is not within the error band, then the method 1035 proceeds to step 1530 where the microcontroller 827 uses the strap temperature obtained from the linear interpolation.

Figure 16:
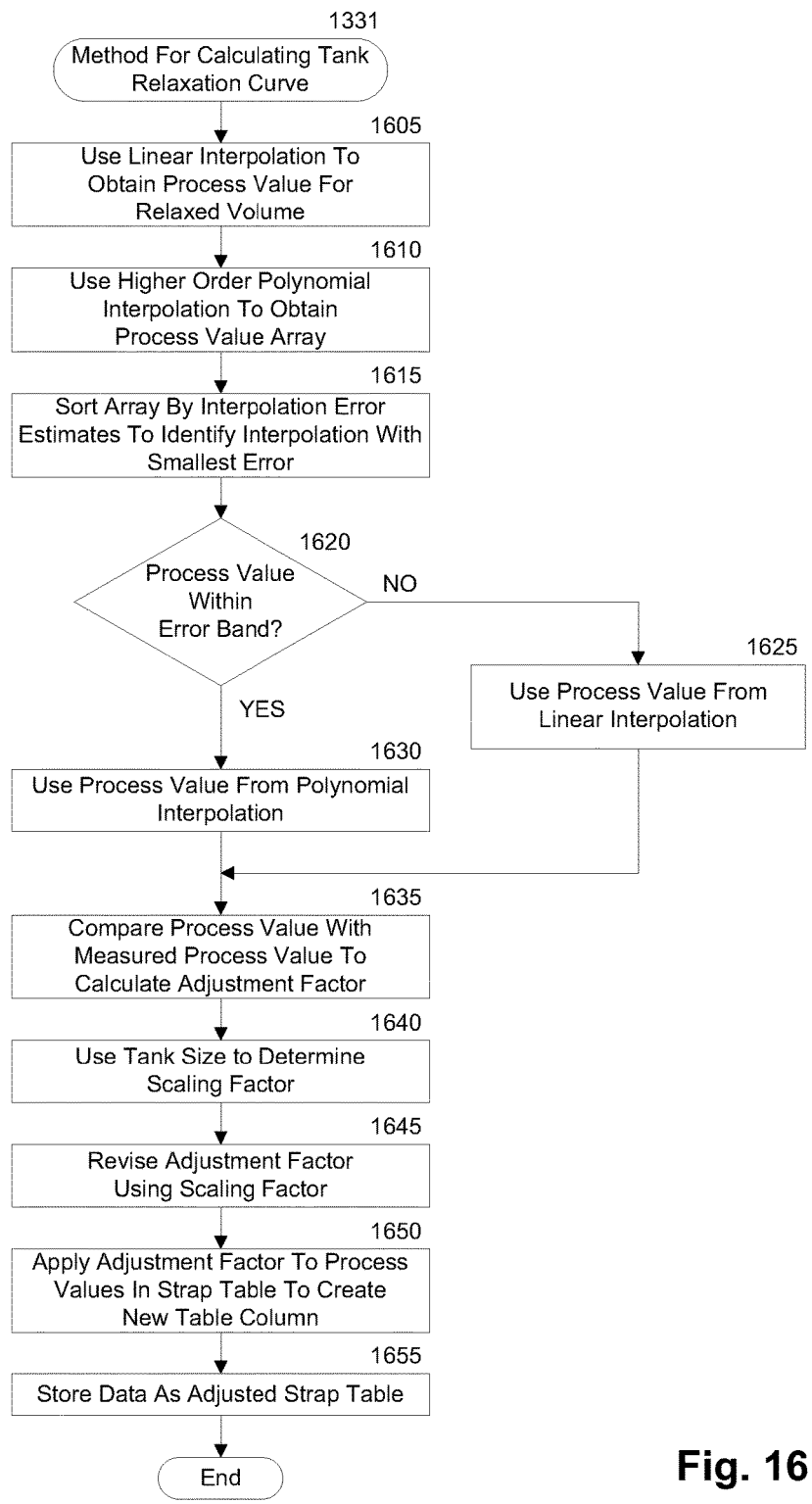
FIG. 16 is a flow chart depicting a method for calculating a tank relaxation curve in accordance with certain exemplary embodiments.

FIG. 16 is a flow chart depicting a method 1331 for calculating a tank relaxation curve in accordance with certain exemplary embodiments. After a collapsible tank 120A-120D is supplied with fuel and stores this fuel for a period of time, the collapsible tank 120A-120D can relax thereby making a strap table generated while filling the collapsible tank 120A-120D inaccurate. For example, if a final process measurement from a learning process completed while filling the collapsible tank 120A-120D was 45 PSI, the pressure may drop to 43 PSI after a 24 hour period due to this relaxation. This method 1331 adjusts the strap table to account for the inaccuracies due to this relaxation.

Referring to FIGS. 1, 8, and 16, in step 1605, microcontroller 827 of interface device 110 accesses a strap table for a collapsible tank 120A-120D. The microcontroller 827 also obtains a current volume of fuel stored in the collapsible tank 120A-120D after the collapsible tank 120A-120D has relaxed. This relaxed volume may be entered by an operator as a configuration value. Typically, the relaxed volume will be the same as the end volume of the learning process. However, the relaxed volume can differ from the end volume if fuel has been added to or removed from the collapsible tank 120A-120D after the learning process was completed. Also, if the learning process was stopped prior to reaching the end volume, the relaxed volume may differ from the end volume. After accessing the strap table and relaxed volume, the microcontroller 827 uses linear interpolation to determine a process value that corresponds to the relaxed volume.

In step 1610, the micro controller 827 generates and solves one or more higher order polynomial interpolations to obtain an array of process values corresponding to the relaxed volume. The microcontroller 827 also estimates an error for each polynomial interpolation. In certain exemplary embodiments, this polynomial interpolation process is based on Neville's algorithm, similar to step 1415 of FIG. 14 described above.

In step 1615, the microcontroller 827 sorts the polynomial interpolations by estimated error to indentify the process value corresponding to the polynomial interpolation having the least estimated error.

In step 1620, the microcontroller 827 determines whether the process value of the polynomial interpolation having the least error is within a predefined error band related to the linear interpolation to ensure that there were no errors in generating the polynomial interpolations. If the process value having the least error is within the error band, then the method 1331 proceeds to step 1630 where the microcontroller 827 uses this process value in place of the process value obtained from the linear interpolation. If the process value having the least error is not within the error band, then the method 1331 proceeds to step 1625 where the microcontroller 827 uses the process value obtained from the linear interpolation.

In step 1635, the microcontroller 827 compares the process value obtained from the interpolation process of steps 1605-1630 with a current measured process value to calculate an adjustment factor. In certain exemplary embodiments, the adjustment factor can be calculated by dividing the current measured process value by the process value obtained from the interpolation process. Thus, the adjustment factor can comprise a ratio of the current measured process value to the process value obtained from the interpolation process.

In step 1640, the microcontroller 827 determines a scaling factor. This scaling factor can be based on characteristics of the collapsible tank 120A-120D, such as the size, material, and manufacturer of the collapsible tank 120A-120D. This scaling factor can be determined using empirical data.

In step 1645, the microcontroller 827 revises the adjustment factor using the scaling factor. In certain exemplary embodiments, the microcontroller 827 revises the adjustment factor by multiplying the adjustment factor by the scaling factor.

In step 1650, the microcontroller 827 applies the adjustment factor to the process values in the strap table and saves these updated process values in a new column of the strap table. In certain exemplary embodiments, the microcontroller 827 applies the adjustment factor to the process values in the strap table by multiplying each process value by the adjustment factor.

In step 1655, the microcontroller 827 stores the adjusted strap table in memory 825. The adjusted strap table can then be used to more accurately determine the volume of fuel stored in the collapsible tank 120A-120D using a current process measurement.

Figure 17:
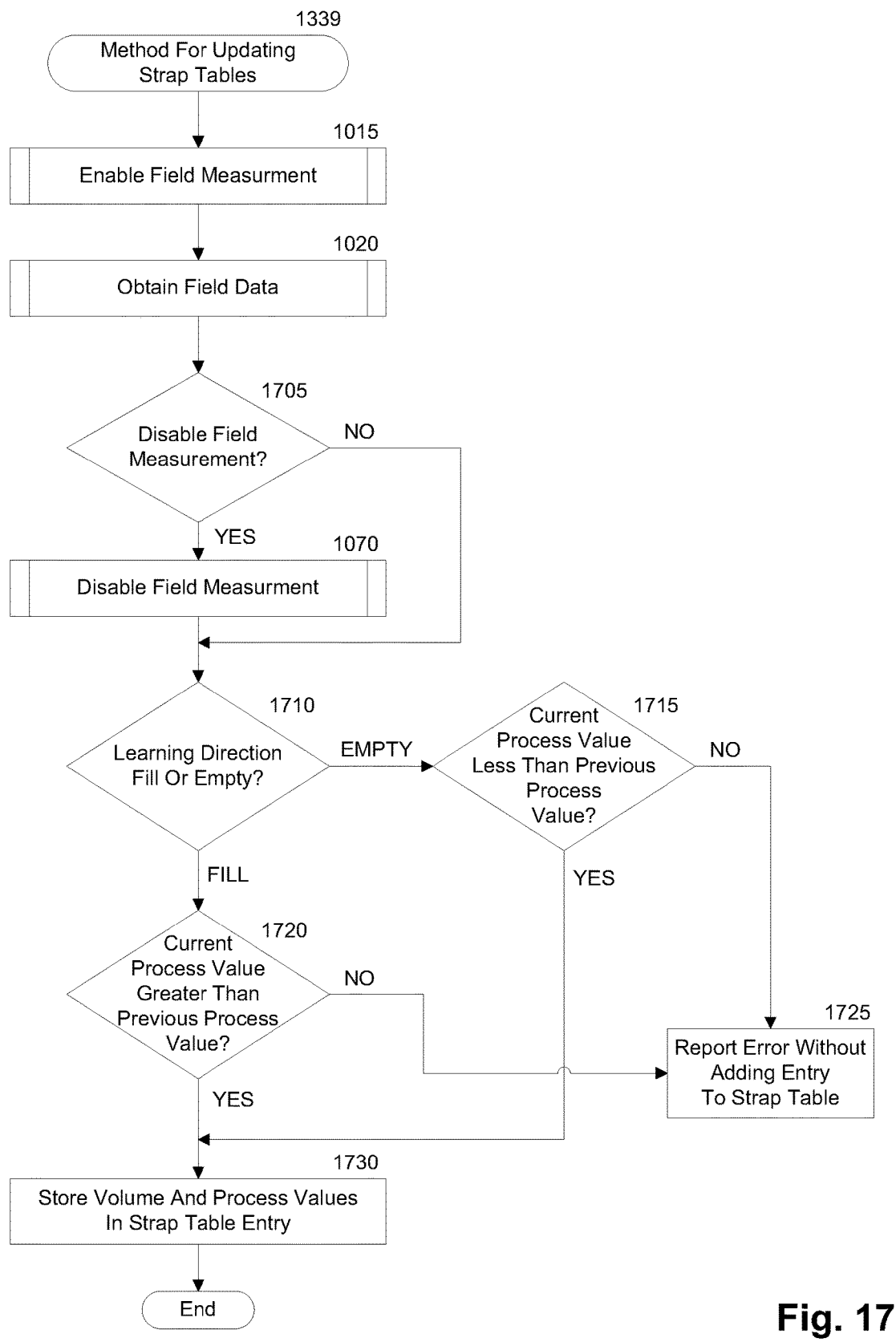
FIG. 17 is a flow chart depicting a method for updating a strap table in accordance with certain exemplary embodiments.

FIG. 17 is a flow chart depicting a method 1339 for updating a strap table in accordance with certain exemplary embodiments. Referring to FIGS. 1, 8, and 17, in step 1015, the interface device 110 enables a field process measurement by the sensor 127A-127D at a current collapsible tank 120A-120D. The interface device 110 enables power to the sensor 127A-127D of the current collapsible tank 120A-120D and enables the sensor interface 811. Step 1015 is described in more detail below with reference to FIG. 18.

In step 1020, the interface device 110 obtains field process data from the sensor 127A-127D at the current collapsible tank 120A-120D and saves the process data in a database in memory 825. Step 1020 is described in more detail below with reference to FIG. 19.

In step 1705, the microcontroller 827 of the interface device 110 determines whether to disable field measurement. If the microcontroller 827 determines to disable field measurement, the method 1339 proceeds to step 1070. Otherwise, the method 1339 proceeds to step 1710.

In step 1070, the microcontroller 827 disables field measurement by disabling the sensor interface 811 and disabling power to the sensors 127A-127D. Step 1070 is described in more detail below with reference to FIG. 20.

In step 1710, the micro controller 827 determines whether the learning process is being performed while filling or emptying the collapsible tank. If the learning direction is filling, the method 1339 proceeds to step 1720. If the learning direction is emptying, the method 1339 proceeds to step 1715.

In step 1715, the microcontroller 827 determines whether the current process measurement obtained in step 1020 is less than a previous process measurement stored in the strap table. If current process measurement is less than the previous measurement, the method 1339 proceeds to step 1730. Otherwise, the method 1339 proceeds to step 1725.

In step 1725, the microcontroller 827 sends a message to a host device 106 or 107 to report an error has occurred as the process value should decrease as the collapsible tank 120A-120D is emptied and the process value should increase as the collapsible tank 120A-120D is filled. The current process value and volume is not stored in the strap table.

In step 1720, the microcontroller 827 determines whether the current process measurement obtained in step 1020 is greater than a previous process measurement stored in the strap table. If current process measurement is greater than the previous measurement, the method 1339 proceeds to step 1730. Otherwise, the method 1339 proceeds to step 1725.

In step 1730, microcontroller 827 stores the current volume and process value in the strap table in memory 825.

Figure 18:
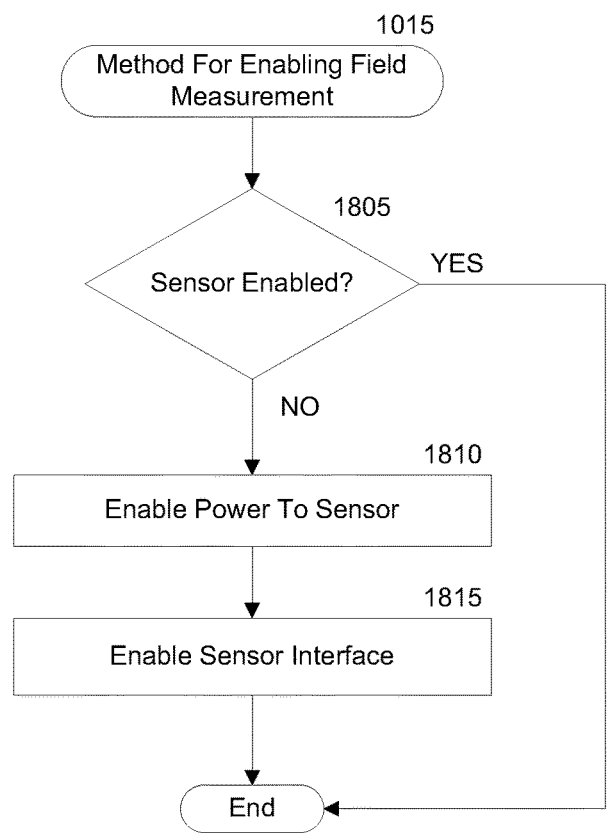
FIG. 18 is a flow chart depicting a method for enabling field measurement in accordance with certain exemplary embodiments.

FIG. 18 is a flow chart depicting a method 1015 for enabling field measurement in accordance with certain exemplary embodiments. Referring to FIGS. 1, 8 and 18, in step 1805, the interface device 110 determines if a sensor 127A-127D at one of the collapsible tanks 120A-120D is enabled. Typically, if a sensor 127A-127D is identified using a searching process, the sensor 127A-127D is automatically enabled. An operator can also enable or disable the sensor 127A-127D via one of the mobile host devices 106 or 107. If the sensor 127A-127D is enabled, the method 1015 ends as the field hardware is already enabled. Otherwise, the method 1015 proceeds to step 1810. In step 1810, the microcontroller 827 enables power to the sensor 127A-127D by enabling step-up/step-down power supply 821. In step 1815, the microcontroller 827 enables sensor interface 811 so that the interface device 110 can interact with the sensor 127A-127D. After step 1815, the method 1015 ends.

Figure 19:
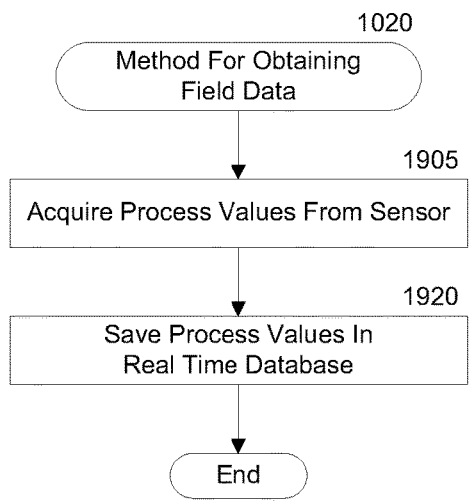
FIG. 19 is a flow chart depicting a method for obtaining field data in accordance with certain exemplary embodiments.

FIG. 19 is a flow chart depicting a method 1900 for obtaining field data in accordance with certain exemplary embodiments. Referring to FIGS. 1,8 and 19, in step 1905, sensor interface 811 acquires one or more process values by polling a sensor 127A-127D at a collapsible tank 120A-120D and receiving the process value(s) from the sensor. For example, the sensor interface 811 may acquire a level measurement from a radar or ultrasonic level transmitter. Or, the sensor interface 811 may acquire a pressure measurement from a pressure transmitter, such as a pressure transmitter coupled to integral sensor 340 of FIG. 3. In step 1920, microcontroller 827 receives the process value(s) from the sensor interface and saves the process value(s) in a real-time database stored in memory 825. After step 1920, the method 1900 ends.

Figure 20:
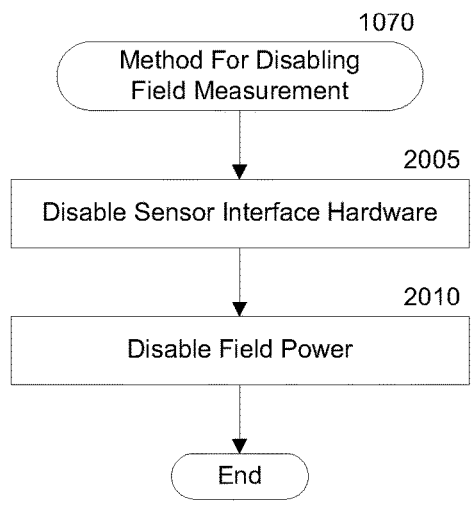
FIG. 20 is a flow chart depicting a method for disabling field measurement in accordance with certain exemplary embodiments.

FIG. 20 is a flow chart depicting a method 1070 for disabling field measurement in accordance with certain exemplary embodiments. Referring to FIGS. 1, 8 and 20, in step 2005, microcontroller 827 disables sensor interface 811. In step 2010, the microcontroller 827 disables power to a sensor 127A-127D at one of the collapsible tanks 120A-120D by disabling step-up/step-down power supply 821. After step 2010, the method 1070 ends.

Figure 21:
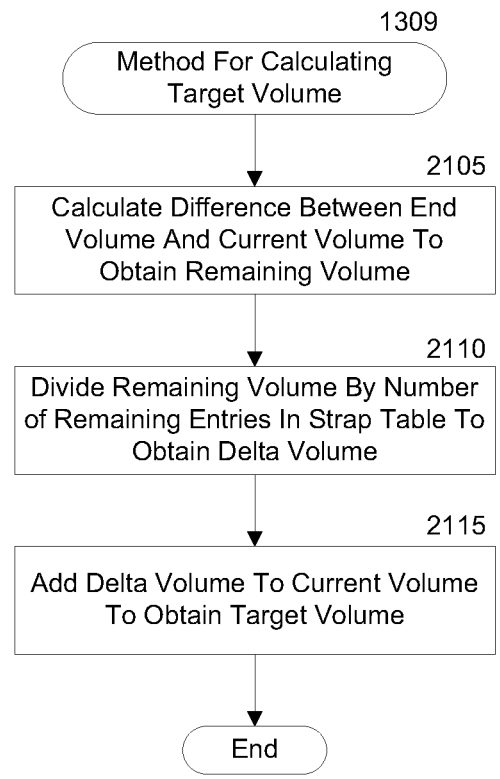
FIG. 21 is a flow chart depicting a method for calculating a target volume in accordance with certain exemplary embodiments.

FIG. 21 is a flow chart depicting a method 1309 for calculating a target volume in accordance with certain exemplary embodiments. Referring to FIGS. 1, 8 and 21, in step 2105, microcontroller 827 of interface device 110 calculates the difference between an end volume for a learning process and a current volume to obtain a remaining volume for a collapsible tank 120A-120D that is the subject of a learning process. The microcontroller 827 may access memory 825 to obtain the final volume and current volume to perform the calculation. In step 2110, the microcontroller 827 divides the calculated remaining volume by a number of remaining entries in a strap table that is being generated by the learning process to obtain a delta volume. In step 2115, the microcontroller 2115 adds the calculated delta volume to the current volume to obtain the target volume. After step 2115, the method 1309 ends.

Figure 22:
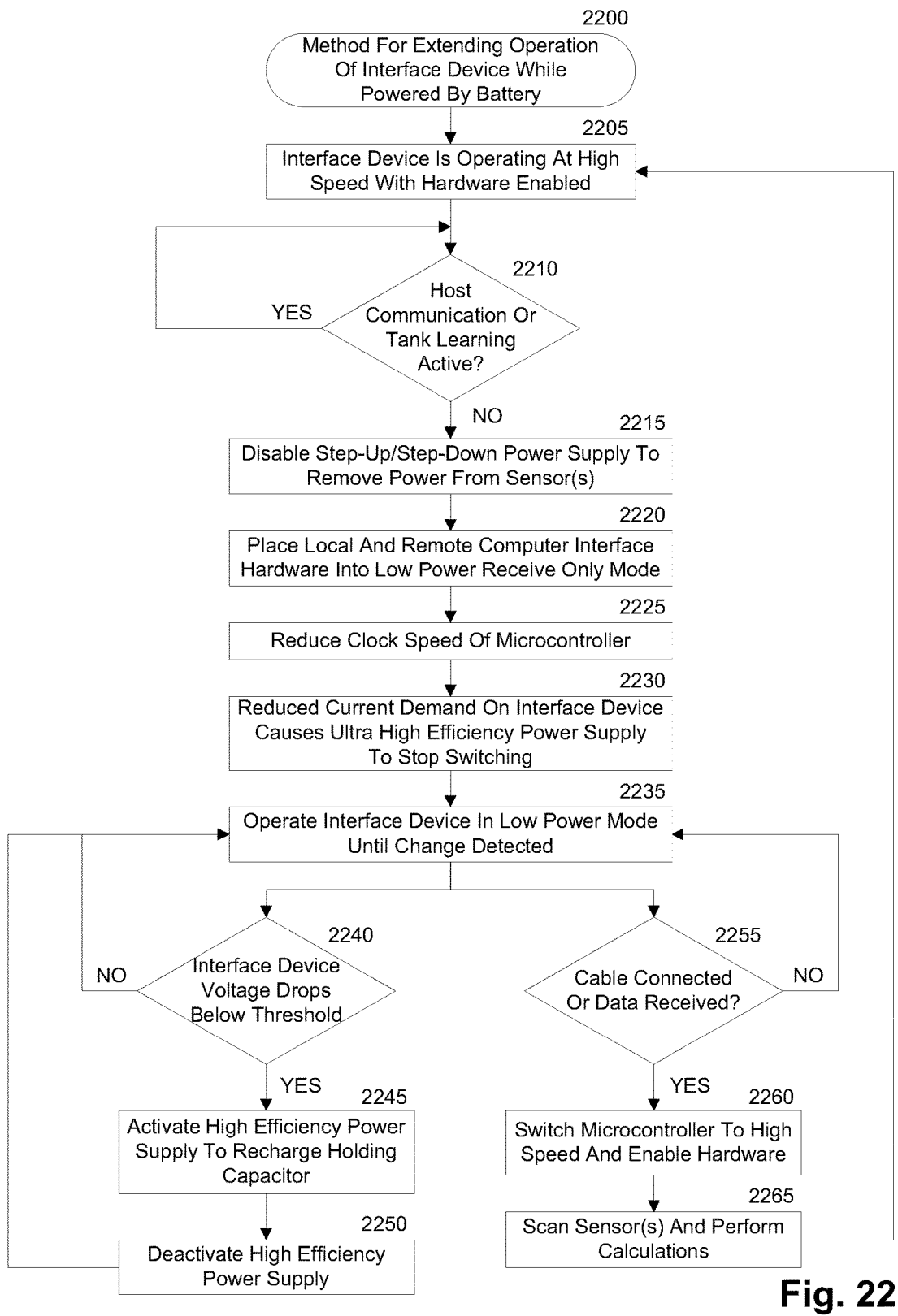
FIG. 22 is a flow chart depicting a method for extending operation of an interface device while powered by a battery in accordance with certain exemplary embodiments.

FIG. 22 is a flow chart depicting a method 2200 for extending operation of an interface device 110 while powered by batteries 823 in accordance with certain exemplary embodiments. Referring to FIGS. 1, 8 and 22, in step 2205, the interface device 110 is operating at high speed with all hardware enabled. In this high speed operation, the interface device 110 can actively interact with sensors 127A-127D, flow meters 115 and 116, and mobile host devices, such as handheld computer 106 and notebook computer 107.

In step 2210, microcontroller 827 determines if the interface device 110 is communicating with a mobile host device 106 or 107 or actively performing a tank learning process. If host communication is active or a tank learning process is active, the method 2200 remains in high speed operation to support the activity and returns to step 2210. Otherwise, the method 2200 proceeds to step 2215 to begin transitioning into a low power mode.

In step 2215, the microcontroller 827 disables step-up/step-down power supply 821 to remove power from field sensors 127A-127D connected to the interface device 110. In step 2220, the microcontroller 827 places local computer interface hardware 829 and remote computer interface hardware 833 into a low power receive only mode. In this low power receive only mode, the computer interface hardware 829 and 833 consume power when data is sensed at that computer interface hardware 829 or 833 only.

In step 2225, the microcontroller 2225 reduces its internal clock speed to low speed. For example, in certain exemplary embodiments, the clock speed of the microcontroller 2225 may be reduced to approximately 3.5% of its normal high speed. In step 2230, a reduced current demand on the interface device 110 resulting from steps 2215 through 2225 causes ultra high efficiency power supply 831 to stop switching. Loading on batteries 823 is reduced, typically to microamps, and current for the microcontroller 827 can be provided by a holding capacitor (not shown). In step 2235, the interface device 110 operates in this low power mode until a change is detected in step 2240 or 2250.

In step 2240, the interface device 110 determines if system voltage provided by the batteries 823 and the holding capacitor drops by a predefined amount. For example, the predefined amount may be 1% of normal system voltage. If the system voltage has not dropped by the predefined amount, the method 2200 returns to step 2235 to continue operating in low power mode. If the system voltage has dropped by the predefined amount, the method 2200 proceeds to step 2245. In step 2245, the microcontroller 827 activates the ultra high efficiency power supply 831 for a brief amount of time to recharge the holding capacitor. After the holding capacitor is recharged, in step 2250, the microcontroller 827 deactivates the ultra high efficiency power supply 831. After step 2250, the method 2200 returns to step 2235.

In step 2255, the microcontroller 827 determines if a cable is connected to computer interface connector 805 or if data is received at remote computer interface hardware 833. As discussed above with reference to FIG. 8, local computer interface hardware 819 includes an auto detection feature that senses when a cable is connected to the computer interface connector 805. When a cable is connected to the computer interface connector 805, the computer interface hardware 819 can send a signal to the microcontroller 827 to indicate that a cable is connected. If remote computer interface hardware 833 receives data while in the low power receive only mode, the remote computer interface hardware 833 can send a signal to the microcontroller 827 indicating that the data is received. If a cable is connected to computer interface connector 805 or if data is received at remote computer interface hardware 833, the method proceeds to step 2260. Otherwise, the method 2200 returns to step 2235 to continue operating in low power mode.

In step 2260, the microcontroller 827 switches to high speed operation and enables hardware in the interface device 110. In step 2265, the microcontroller 827 can interface with a sensor 127A-127D connected the sensor connector 801A or 801B via sensor interface 811 to acquire a current process measurement. The microcontroller 827 also performs any necessary calculations. After step 2265, the method 2200 returns to step 2205 to continue operating at high speed.

One of ordinary skill in the art would appreciate that the present invention provides systems and methods for accurately measuring, controlling, and automating inventory of product stored in a collapsible tank. An interface device can interact with a sensor installed at the collapsible tank and a metering device, such as a flow meter, to generate a strap table for the collapsible tank. The strap table can include entries that correlate a process value measured by the sensor to a volume of product corresponding to that process value. Current volume of product stored in the collapsible tank can be determined by comparing a current process value to entries in the strap table or by using an interpolation process. The interface device can generate an updated strap table to account for settling of the collapsible tank. The interface device can synchronize data with a mobile host device, such as a notebook computer or handheld computer. The mobile host device can also synchronize data with a host system that can expose the data to other systems.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A method for determining volume of a product stored in a collapsible container, the method comprising:
   providing a vent pipe in the collapsible container, wherein the vent pipe includes a level detecting sensor therein;
   performing a learning process on the collapsible container when the collapsible container is at one of zero volume or a final volume at a start of the learning process, the learning process being associated with a plurality of process measurements and corresponding volumes of product stored in the collapsible container, wherein the learning process includes generating a strap table associated with the collapsible container by, obtaining an initial first process measurement in the form of a first product level measurement from the level detecting sensor;

transmitting the first product level measurement to an interface device communicatively connected to the level detecting sensor;

storing the initial first process measurement as an initial entry in the strap table with a corresponding volume of either zero volume or final volume;

storing additional entries in the strap table while supplying or removing product to or from the collapsible container via a supply line, each additional entry being added to the strap table when the volume of product in the collapsible container reaches a target volume for that entry, wherein the target volume is determined using a flow meter disposed in the supply line and further wherein the flow meter is communicatively connected to the interface device;

storing a final entry in the strap table when the volume of product in the collapsible container reaches one of zero volume or the final volume;

accessing product in the collapsible container via the supply line, wherein the accessing changes a volume of the product in the collapsible container;

obtaining by the interface device a current process measurement from the level detecting sensor associated with the collapsible container; and determining by the interface device a volume of product currently stored in the collapsible container based on a comparison of the current process measurement with one or more entries in the strap table.

2. The method of claim 1, wherein determining by the interface device a volume of product currently stored in the collapsible container comprises determining a first strap volume corresponding to the current process measurement by performing a first interpolation on the strap table using the current process measurement.

3. The method of claim 2, wherein determining by the interface device a volume of product currently stored in the collapsible container further comprises determining a second strap volume corresponding to the current process measurement by performing a second interpolation on the strap table using the current process measurement.

4. The method of claim 3, wherein
the first interpolation comprises a linear interpolation,
the second interpolation comprises at least one polynomial interpolation, and
determining by the interface device a volume of product currently stored in the collapsible container further comprises selecting the first or second strap volume as the volume of product stored in the collapsible container.

5. The method of claim 4, wherein determining by the interface device a second strap volume comprises:
generating an array of strap volumes by performing the at least one polynomial interpolation;
estimating an error associated with at least one of the strap volumes in the array; and
selecting one of the strap volumes in the array of strap volumes having the least estimated error as the second strap volume.

6. The method of claim 4, wherein selecting the first or second strap volume comprises:
determining by the interface device if the second strap volume meets an error threshold relative to a linear interpolation of the strap table;

selecting the second strap volume based on a determination that the second strap volume meets the error threshold; and selecting the first strap volume based on a determination that the second strap volume does not meet the error threshold.

7. The method of claim 1, further comprising adjusting the learning process to account for the collapsible container relaxing with product stored in the collapsible container.

8. The method of claim 1, wherein the learning process is performed while filling the collapsible container and comprises:
obtaining an initial process measurement from the level detecting sensor;
storing the initial process measurement as an initial entry in a strap table with a corresponding volume of zero;
storing additional entries in the strap table while supplying product to the collapsible container, each additional entry being added when the volume of product in the collapsible container reaches a target volume for that entry; and
storing a final entry in the strap table when the volume of product in the collapsible container reaches a final volume.

9. The method of claim 1, wherein the learning process is performed while emptying the collapsible container and comprises:
obtaining an initial process measurement from the level detecting sensor;
storing the initial process measurement as an initial entry in a strap table with a corresponding initial volume, the initial volume equal to the volume of product stored in the collapsible container when the initial process measurement is obtained;
storing additional entries in the strap table while releasing product from the collapsible container, each additional entry being added when the volume of product in the collapsible container reaches a target volume for that entry; and
storing a final entry in the strap table when the volume of product in the collapsible container reaches a final volume.

10. The method of claim 1, wherein the vent pipe further includes a temperature sensor therein, wherein the plurality of process measurements further comprises a temperature obtained from the temperature sensor when the collapsible container stores a respective volume of product.

11. The method of claim 1, wherein the vent pipe further includes an integral temperature and pressure sensor therein, wherein the plurality of process measurements further comprises both a pressure and temperature obtained from the integral temperature and pressure sensor when the collapsible container stores a respective volume of product.

12. The method of claim 1, wherein the sensor comprises at least two sensors among a temperature sensor, a pressure sensor, and a level sensor, and each process measurement comprises a measurement obtained from at least one of the sensors.

13. A system for determining volume of a product stored in a collapsible tank, comprising:
a collapsible container including a supply line connected thereto for facilitating the addition and removal of product thereto and therefrom and a removable vent pipe fitted thereto during addition and removal of product thereto and therefrom wherein the collapsible container further includes;

at least one sensor located in the removable vent pipe for obtaining process measurements for the collapsible tank; and an interface device communicably coupled to the at least one sensor, the interface device operable to:

perform a learning process on the collapsible tank, the learning process being associated with a plurality of process measurements and corresponding volumes of product stored in the collapsible tank, wherein the learning process includes generating a strap table by, obtaining an initial first process measurement in the form of a first measurement from the at least one sensor;

storing the initial first process measurement as an initial entry in the strap table associated with the collapsible container with a corresponding volume of either zero volume or a final volume;

storing additional entries in the strap table while supplying or removing product to or from the collapsible container, each additional entry being added to the strap table when the volume of product in the collapsible container reaches a target volume for that entry, wherein the target volume is determined using a flow meter disposed in the supply line connected to the collapsible container;

storing a final entry in the strap table when the volume of product in the collapsible container reaches one of zero volume or the final volume;

accessing product in the collapsible container, wherein the accessing changes a volume of the collapsible container; and determine a current volume of product stored in the collapsible tank after product in the collapsible container has been accessed, thereby changing a volume of the product in the collapsible container by obtaining a current process measurement from the at least one sensor and performing a comparison of the current process measurement with one or more entries in the strap table.

14. The system of claim 13, wherein the comparison comprises at least one interpolation and the interface device is further operable to determine a first strap volume by performing a linear interpolation on the strap table using the current process measurement.

15. The system of claim 14, wherein the comparison comprises at least one interpolation and the interface device is further operable to determine a second strap volume by performing a polynomial interpolation on the strap table using the current process measurement.

16. The system of claim 15, wherein the interface device is further operable to select the first or second strap volume as the current volume of the product stored in the collapsible tank.

17. The system of claim 16, wherein the interface device selects the first strap volume when the first strap volume meets an error criteria.

18. The system of claim 17, wherein the error criteria comprises an error band of process measurements relative to a linear interpolation of the strap table.

19. The system of claim 16, wherein the interface device is further operable to adjust the strap table to account for the collapsible tank relaxing with product stored in the collapsible container.

20. The system of claim 16, wherein the interface device is operable while filling the collapsible tank and is further operable to:

obtain an initial process measurement from the at least one sensor, store the initial process measurement as an initial entry in a strap table with a corresponding volume of zero, store additional entries in the strap table while supplying product to the collapsible tank, each additional entry being added when the volume of product in the collapsible tank reaches a target volume for that entry, and store a final entry in the strap table when the volume of product in the collapsible tank reaches a final volume.

21. The system of claim 13, wherein the interface device is operable while emptying the collapsible tank and is further operable to:

obtain an initial process measurement from the at least one sensor, store the initial process measurement as an initial entry in a strap table with a corresponding initial volume, the initial volume equal to the volume of product stored in the collapsible tank when the initial process measurement is obtained, store additional entries in the strap table while releasing product from the collapsible tank, each additional entry being added when the volume of product in the collapsible tank reaches a target volume for that entry, and store a final entry in the strap table when the volume of product in the collapsible tank reaches a final volume.

22. The system of claim 13, wherein the at least one sensor comprises a level sensor and each process measurement comprises a level obtained from the level sensor for a volume of product held by the collapsible tank.

23. The system of claim 13, wherein the at least one sensor comprises a pressure sensor and each process measurement comprises a pressure obtained from the pressure sensor for a volume of product held by the collapsible tank.

24. The system of claim 13, wherein the at least one sensor comprises a temperature sensor and each process measurement comprises a temperature obtained from the temperature sensor for a volume of product held by the collapsible tank.

25. The system of claim 13, wherein the at least one sensor comprises at least two sensors among a temperature sensor, a pressure sensor, and a level sensor, and each process measurement comprises a measurement obtained from at least one of the sensors.

26. The system of claim 13, wherein the at least one sensor and the interface device are integrated as a single device.

* * * * *